United States Patent
Ichii et al.

(10) Patent No.: US 12,099,836 B2
(45) Date of Patent: Sep. 24, 2024

(54) SOURCE CODE ANALYSIS APPARATUS AND SOURCE CODE ANALYSIS METHOD

(71) Applicant: Hitachi, Ltd., Tokyo (JP)

(72) Inventors: Makoto Ichii, Tokyo (JP); Masumi Kawakami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 269 days.

(21) Appl. No.: 17/735,267

(22) Filed: May 3, 2022

(65) Prior Publication Data

US 2022/0391203 A1    Dec. 8, 2022

(30) Foreign Application Priority Data

Jun. 4, 2021 (JP) ................................ 2021-094819

(51) Int. Cl.
*G06F 8/75* (2018.01)
*G06F 8/72* (2018.01)
*G06F 8/77* (2018.01)

(52) U.S. Cl.
CPC .............. *G06F 8/75* (2013.01); *G06F 8/72* (2013.01); *G06F 8/77* (2013.01)

(58) Field of Classification Search
None
See application file for complete search history.

(56) References Cited

U.S. PATENT DOCUMENTS 11,587,013 B2 *   2/2023   Honrao ............ G06Q 10/06395
11,662,997 B2 *   5/2023   Farrier ...................... G06F 8/71
                                                                717/101

(Continued)

FOREIGN PATENT DOCUMENTS

JP          6310865 B2      4/2018
JP         2019-79312 A     5/2019
JP        2019-219848 A    12/2019

OTHER PUBLICATIONS

P. Marcu, G. Grabarnik, L. Luan, D. Rosu, L. Shwartz and C. Ward, "Towards an optimized model of incident ticket correlation," 2009 IFIP/IEEE International Symposium on Integrated Network Management, New York, NY, USA, 2009, pp. 569-576. (Year: 2009).*

(Continued)

*Primary Examiner* — Andrew M. Lyons
(74) *Attorney, Agent, or Firm* — Crowell & Moring LLP

(57) ABSTRACT

When any one or a combination of a ticket, a source code change history, and a source code is input, a source code analysis apparatus generates information of a factor pattern from the information, and a factor metrics calculation unit calculates factor metrics regarding the factor pattern as measured information regarding the factor pattern. In addition, the QCD measurement value is acquired from the information, the QCD index is calculated based on the QCD measurement value, and the correlation calculation unit calculates a correlation coefficient for a pair of the factor metrics and the QCD index, stores the correlation coefficient in the correlation list, calculates a score for the pair of the factor pattern and the QCD measurement value, and generates the important factor pattern information table in which the score is assigned to the pair of the factor pattern and the QCD measurement value.

6 Claims, 23 Drawing Sheets

(56) References Cited

U.S. PATENT DOCUMENTS

| | | | |
|---|---|---|---|
| 2011/0270804 A1* | 11/2011 | Hadar | H04L 43/08 |
| | | | 707/684 |
| 2017/0046246 A1* | 2/2017 | Kaulgud | G06Q 30/0282 |
| 2017/0235569 A1* | 8/2017 | Sturtevant | G06Q 40/12 |
| | | | 717/102 |
| 2021/0124561 A1* | 4/2021 | Pezaris | G06F 8/77 |
| 2022/0179773 A1* | 6/2022 | Peng | G06F 11/3604 |
| 2022/0224709 A1* | 7/2022 | Vasudevan | G06F 21/606 |

OTHER PUBLICATIONS

Extended European Search Report issued in European Application No. 22171916.4 dated Oct. 24, 2022 (nine (9) pages).
Y. Yamatani et al., "A Data Mining Method for Understanding Co-evolution of OSS Systems and Communities", Journal of Information Processing Society of Japan, 2015, vol. 56, No. 1, pp. 59-71 with English Abstract (13 pages).

\* cited by examiner

| FACTOR PATTERN NAME | DETECTION ID | PROGRAM ELEMENT | ATTRIBUTE VALUE 1 | ... |
|---|---|---|---|---|
| ANTI-PATTERN 1 | 1 | A | 0.5 | |
| ANTI-PATTERN 1 | 1 | B | 0.3 | |
| ANTI-PATTERN 1 | 2 | C | 0.8 | |
| IMPROVEMENT-PATTERN 1 | 1 | D | 1 | |
| | | | | |

| PROGRAM ELEMENT NAME | FACTOR METRICS 1 | FACTOR METRICS 2 | ... |
|---|---|---|---|
| PROGRAM ELEMENT A | 0.5 | 2 | |
| PROGRAM ELEMENT B | 0.3 | 2 | |
| PROGRAM ELEMENT C | 0.8 | 1 | |
| PROGRAM ELEMENT D | 1 | 1 | |
| | | | |

| QCD MEASUREMENT VALUE TYPE (126a) | MEASUREMENT ID (126b) | PROGRAM ELEMENT (126c) | MEASUREMENT VALUE 1 ($126d_1$) | ... |
|---|---|---|---|---|
| TICKET MEASUREMENT VALUE 1 | 1 | A | 10 | |
| TICKET MEASUREMENT VALUE 1 | 1 | B | 10 | |
| TICKET MEASUREMENT VALUE 1 | 2 | C | 5 | |
| CHANGE HISTORY MEASUREMENT VALUE 1 | 1 | D | 1 | |
| | | | | |

| PROGRAM ELEMENT NAME (127a) | QCD INDEX 1 ($127b_1$) | QCD INDEX 2 ($127b_2$) | ... |
|---|---|---|---|
| PROGRAM ELEMENT A | 10 | 2 | |
| PROGRAM ELEMENT B | 10 | 2 | |
| PROGRAM ELEMENT C | 5 | 1 | |
| PROGRAM ELEMENT D | 10 | 1 | |
| | | | |

| FACTOR METRICS NAME | QCD INDEX NAME | CORRELATION COEFFICIENT |
|---|---|---|
| FACTOR METRICS 1 | QCD INDEX 1 | 0.8 |
| FACTOR METRICS 1 | QCD INDEX 2 | 0.5 |
| ... | | |
| | | |
| | | |

| FACTOR PATTERN TYPE NAME | FACTOR METRICS NAME | WEIGHT |
|---|---|---|
| ANTI-PATTERN 1 | FACTOR METRICS 1 | 0.8 |
| ANTI-PATTERN 1 | FACTOR METRICS 2 | 0.2 |
| IMPROVEMENT-PATTERN 1 | FACTOR METRICS 3 | 1.0 |
| | | |
| | | |

| QCD MEASUREMENT VALUE NAME | QCD INDEX NAME | INFLUENCE VIEWPOINT | WEIGHT |
|---|---|---|---|
| TICKET MEASUREMENT VALUE 1 | QCD INDEX 1 | Q | 0.8 |
| TICKET MEASUREMENT VALUE 1 | QCD INDEX 2 | Q | 0.2 |
| CHANGE HISTORY MEASUREMENT VALUE 2 | QCD INDEX 3 | C | 1.0 |
|  |  |  |  |
|  |  |  |  |

| FACTOR PATTERN TYPE NAME | QCD MEASUREMENT VALUE NAME | INFLUENCE VIEWPOINT | SCORE | RANK |
|---|---|---|---|---|
| ANTI-PATTERN 1 | TICKET MEASUREMENT VALUE 1 | Q | +100 | 1 |
| ANTI-PATTERN 1 | CHANGE HISTORY MEASUREMENT VALUE 2 | C | +50 | 2 |
|  |  |  |  |  |
|  |  |  |  |  |
|  |  |  |  |  |

| PROGRAM ELEMENT NAME (132a) | TIME POINT (132b) | FACTOR METRICS 1 ($132c_1$) | FACTOR METRICS 2 ($132c_2$) | ... |
|---|---|---|---|---|
| PROGRAM ELEMENT A | 2020/1 | 0.5 | 2 | |
| PROGRAM ELEMENT A | 2020/2 | 0.3 | 2 | |
| PROGRAM ELEMENT A | 2020/3 | 0.4 | 3 | |
| | | | | |
| | | | | |

| PROGRAM ELEMENT NAME (133a) | TIME POINT (133b) | QCD INDEX 1 ($133c_1$) | QCD INDEX 2 ($133c_2$) | ... |
|---|---|---|---|---|
| PROGRAM ELEMENT A | 2020/1 | 10 | 2 | |
| PROGRAM ELEMENT A | 2020/2 | 11 | 1 | |
| PROGRAM ELEMENT A | 2020/3 | 12 | 2 | |
| | | | | |
| | | | | |

| FACTOR METRICS NAME (134a) | QCD INDEX NAME (134b) | ADD COEFFICIENT (134c) | DIFFERENCE COEFFICIENT (134d) | DELAY COEFFICIENT (134e) | TIME-DELAYED CORRELATION COEFFICIENT (134f) |
|---|---|---|---|---|---|
| FACTOR METRICS 1 | QCD INDEX 1 | 3 | 2 | 2 | 0.8 |
| FACTOR METRICS 1 | QCD INDEX 2 | 4 | 1 | 2 | 0.5 |
| ... | | | | | |
| | | | | | |
| | | | | | |

| PATTERN TYPE NAME (135a) | QCD MEASUREMENT VALUE NAME (135b) | INFLUENCE VIEWPOINT (135c) | SCORE (135d) | INFLUENCE PERIOD (135e) |
|---|---|---|---|---|
| ANTI-PATTERN 1 | TICKET MEASUREMENT VALUE 1 | Q | +100 | 3 |
| ANTI-PATTERN 1 | CHANGE HISTORY MEASUREMENT VALUE 2 | C | +50 | 5 |
| | | | | |
| | | | | |
| | | | | |

SOURCE CODE ANALYSIS APPARATUS AND SOURCE CODE ANALYSIS METHOD

BACKGROUND OF THE INVENTION

1. Field of the Invention

The present invention relates to a source code analysis apparatus and a source code analysis method, and relates to a source code analysis apparatus and a source code analysis method suitable for facilitating finding of a problem in software development and improving software quality and software development efficiency in analyzing a source code in refactoring of software development.

2. Description of the Related Art

In recent software development, derivative development of developing new software by extending or changing the developed base software is mainstream. In derivative development of software, repetition of function enhancement or change for many years complicates software, and readability of source code is likely to deteriorate. In order to solve such a situation, software refactoring is generally performed. Refactoring is to change the internal structure of the software without changing the behavior of the software. If components (hereinafter, referred to as a "program element") of a program such as methods, classes, and files with low maintainability are appropriately refactored, the software can be easily extended or changed.

One of the methods often performed in refactoring is to focus on anti-patterns. The anti-pattern is a collection of a feature (hereinafter, referred to as "problem feature") of a program element having low maintainability, which is problematic in software development, and a pattern of a refactoring method of the program element having the problem feature. If the program element having the problem feature indicated by the anti-pattern can be specified in the software to be refactored, the software can be refactored by improving the anti-pattern.

For example, JP 2019-79312 A discloses a technique for finding an anti-pattern in source code analysis of software. JP 2019-79312 A describes a method of generating a logical coupling graph from a source code and a program element change history and evaluating whether the anti-pattern of the source code is applicable in source code analysis of software. In addition, JP 2019-219848 A describes a method of measuring metrics from a source code and a program element change history and evaluating whether the anti-pattern of the source code is applicable. These methods can identify source code that truly needs refactoring without extracting complex source code that does not need refactoring.

In addition, "Data mining method for understanding co-evolution of OSS system and community" (Yamatani et al., Journal of Information Processing Society of Japan, Vol. 56, No. 1, 2015) discloses a technology of performing correlation analysis (time-delayed correlation analysis) in consideration of a temporal order in order to analyze a software development process of open source software (OSS).

SUMMARY OF THE INVENTION

Both the source code analysis methods described in JP 2019-79312 A and JP 2019-219848 A of the related art detect a specific type of anti-pattern from the source code. Therefore, the maintenance factor of software needs to determine what anti-pattern is to be extracted prior to the anti-pattern detection, but what type of anti-pattern should be preferentially improved differs depending on the nature of the software and the like, and thus, advanced knowledge is required for the maintenance factor of the software that performs refactoring. For example, there is Shotgun surgery as an anti-pattern detected by the method of JP 2019-79312 A. Shotgun surgery has a problem feature that when the program element is expanded or changed, many other program elements are also expanded or changed at the same time. In addition, for example, there is a long method as an anti-pattern detected by the method of JP 2019-219848 A. The long method has a problem feature that the code number of a method as a program element is too large, and readability of the program element is lowered. As described above, in the methods described in JP 2019-79312 A and JP 2019-219848 A, it is possible to point out a problem in a pattern of a specific source code from different viewpoints, but it is not possible to determine which of the problem pointed out by the method of JP 2019-79312 A and the problem pointed out by the method of JP 2019-219848 A is a problem that becomes a barrier in software development.

Further, at the time of refactoring, the source code is improved by a change method called refactoring pattern. For example, as an example of the refactoring pattern, there is a move method of moving one method to another method. As another example of the refactoring pattern, there is an extract method that cuts out a part of a method as another new method. However, as described above, the effect of changing the source code according to the refactoring pattern varies depending on the nature of the software and the like as well as the adverse effect of the anti-pattern, and thus, the maintenance personnel of the software that performs refactoring needs to have advanced knowledge.

An object of the present invention is to provide a source code analysis apparatus and a source code analysis method that can quantitatively evaluate different types of anti-pattern detection results or refactoring pattern application results, easily find problems in software development, and improve software quality and software development efficiency in analyzing source code in software development refactoring.

The configuration of the source code analysis apparatus of the present invention is preferably a source code analysis apparatus that presents an influence of a factor pattern on software development by using an anti-pattern or a refactoring pattern in software development as the factor pattern. The source code analysis apparatus includes: a factor pattern acquisition unit configured to acquire information on a factor pattern from a ticket, a source code change history, and a source code related to software to be analyzed; a factor metrics calculation unit configured to calculate factor metrics from the factor pattern; a QCD measurement value acquisition unit configured to acquire a QCD measurement value, which is a measured value related to any of quality, cost, and delivery, from a ticket to be analyzed, a change history, and a source code; a QCD index calculation unit configured to calculate a QCD index for evaluating quality, cost, and delivery from the QCD measurement value; and a correlation calculation unit configured to calculate a correlation between the factor metrics and the QCD index and generate a correlation list. When any one or a combination of the ticket, the source code change history, and the source code is input, the factor pattern acquisition unit generates information on a factor pattern from the ticket, the source code change history, and the source code which are input. The factor metrics calculation unit calculates factor metrics related to the factor pattern as measured information related to the factor pattern. The QCD measurement value acquisition unit acquires the QCD measurement value from the ticket, the source code change history, and the source code which are input. The QCD index calculation unit calculates the QCD index based on the QCD measurement value. The correlation calculation unit calculates a correlation coefficient for a pair of the factor metrics and the QCD index, and stores the correlation coefficient in the correlation list.

According to the present invention, it is provided a source code analysis apparatus and a source code analysis method that can quantitatively evaluate different types of anti-pattern detection results or refactoring pattern application results, easily find problems in software development, and improve software quality and software development efficiency in analyzing source code in software development refactoring.

BRIEF DESCRIPTION OF THE DRAWINGS

FIG. 4 is a diagram illustrating an example of a factor pattern attribute table;

FIG. 5 is a diagram illustrating an example of a factor metrics table;

FIG. 6 is a diagram illustrating an example of a QCD measurement value attribute table;

FIG. 7 is a diagram illustrating an example of a QCD index table;

FIG. 8 is a diagram illustrating an example of a correlation list;

FIG. 9 is a diagram illustrating an example of a factor pattern/factor metrics definition table;

FIG. 10 is a diagram illustrating an example of a QCD measurement value/QCD index definition table;

FIG. 11 is a diagram illustrating an example of an important factor pattern information table;

FIG. 22 is a diagram illustrating an example of a time-series factor metrics table;

FIG. 23 is a diagram illustrating an example of a time-series QCD index table;

FIG. 24 is a diagram illustrating an example of a delay correlation list;

FIG. 25 is a diagram illustrating an example of an important factor pattern information table by time-delayed correlation analysis;

DESCRIPTION OF THE PREFERRED EMBODIMENTS

Hereinafter, each embodiment according to the present invention will be described with reference to FIGS. 1 to 30.

First Embodiment

Hereinafter, a first embodiment according to the present invention will be described with reference to FIGS. 1 to 18.

The present embodiment relates to a source code analysis apparatus that quantitatively evaluates different types of anti-pattern detection results or refactoring pattern application results when analyzing source codes in software development refactoring. Hereinafter, the anti-pattern and the refactoring pattern are collectively referred to as "factor pattern".

In addition, in the present embodiment, a program element called a method or a function is targeted, but the unit of the program element is not limited to the method, and any unit such as a class, a module structure, or a structure can be applied as long as the unit is defined by a factor pattern.

First, a configuration of the source code analysis apparatus and an outline of processing executed by the source code analysis apparatus will be described with reference to FIGS. 1 to 3.

Figure 1:
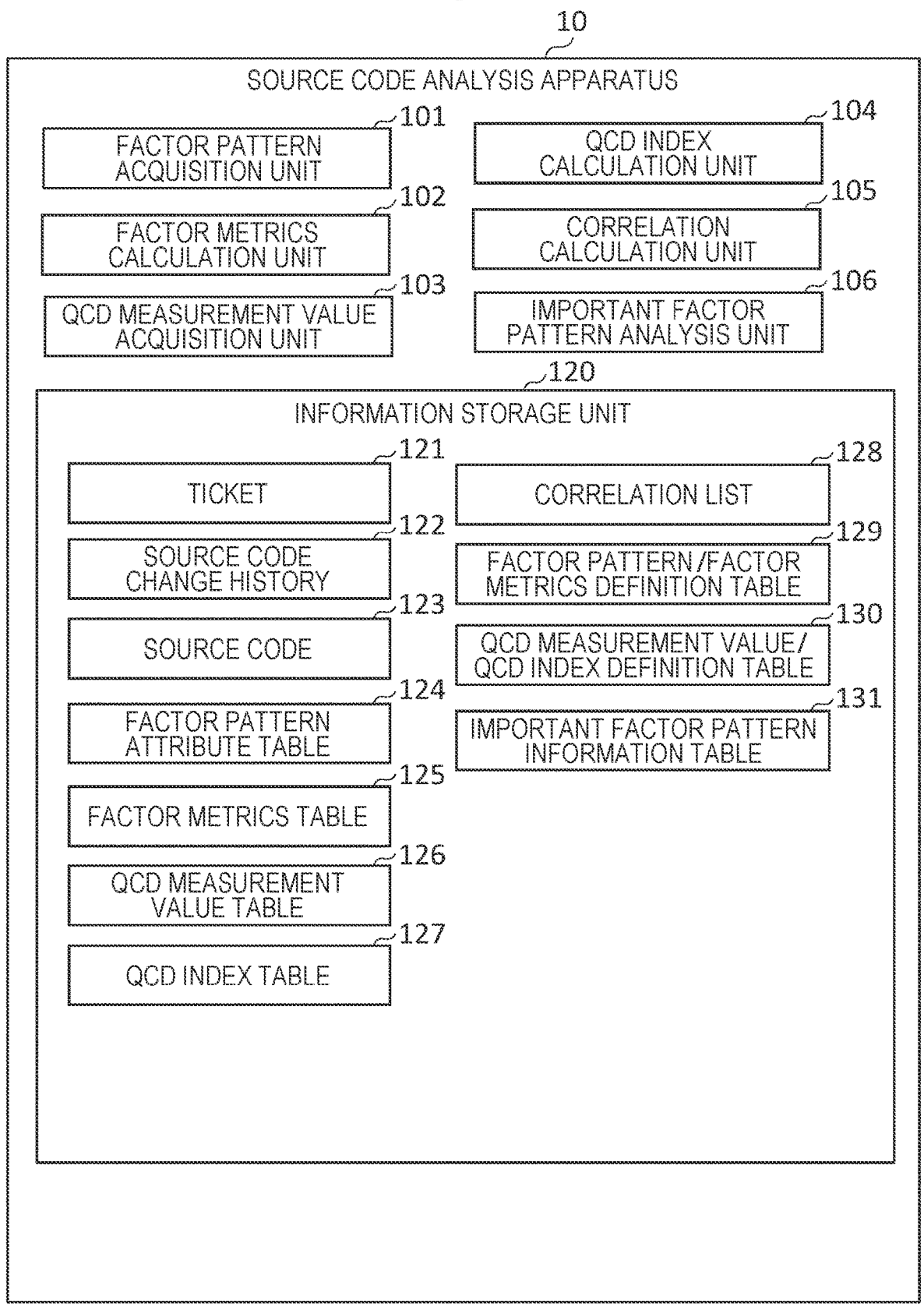
FIG. 1 is a functional configuration diagram of a source code analysis apparatus according to a first embodiment.

As illustrated in FIG. 1, a source code analysis apparatus 10 includes, as functional units, a factor pattern acquisition unit 101, a factor metrics calculation unit 102, a QCD measurement value acquisition unit 103, a QCD index calculation unit 104, a correlation calculation unit 105, an important factor pattern analysis unit 106, and an information storage unit 120.

The factor pattern acquisition unit 101 is a functional unit that receives a ticket 121, a source code change history 122, and a source code 123 as analysis targets and generates a factor pattern attribute table 124.

The factor metrics calculation unit 102 is a functional unit that receives the information of the factor pattern attribute table 124 and generates a factor metrics table 125.

The QCD measurement value acquisition unit 103 is a functional unit that receives the ticket 121, the source code change history 122, and the source code 123 and generates a QCD measurement value table 126.

The QCD index calculation unit 104 is a functional unit that receives the information of the QCD measurement value table 126 and generates a QCD index table 127.

The correlation calculation unit 105 is a functional unit that receives the information of the factor metrics table 125 and the QCD index table 127 and generates a correlation list 128.

The important factor pattern analysis unit 106 is a functional unit that receives the information of the correlation list 128, a factor pattern/factor metrics definition table 129, and a QCD measurement value/QCD index definition table 130 and generates an important factor pattern information table 131.

The information storage unit 120 is a functional unit that stores data used by the source code analysis apparatus 10. The ticket 121, the source code change history 122, the source code 123, the factor pattern attribute table 124, the factor metrics table 125, the QCD measurement value table 126, the QCD index table 127, the correlation list 128, the factor pattern/factor metrics definition table 129, the QCD measurement value/QCD index definition table 130, and the important factor pattern information table 131 are stored in the information storage unit 120 of the source code analysis apparatus 10. In addition to these pieces of information, the information storage unit 120 stores information appropriately referred to or generated by the factor pattern acquisition unit 101, the factor metrics calculation unit 102, the QCD measurement value acquisition unit 103, the QCD index calculation unit 104, the correlation calculation unit 105, and the important factor pattern analysis unit 106. The information storage unit 120 manages information stored in an auxiliary storage device 16 by, for example, a file system or a database management system (DBMS).

Note that details of the table used by the source code analysis apparatus 10 will be described later.

Next, a hardware and software configuration of the source code analysis apparatus will be described with reference to FIG. 2.

The source code analysis apparatus 10 is an information processing apparatus used for development, maintenance, and the like of a software system, and can be realized by a general personal computer (PC). In addition, the source code analysis apparatus 10 may be virtually realized like a cloud server or the like provided by a cloud system.

Figure 2:
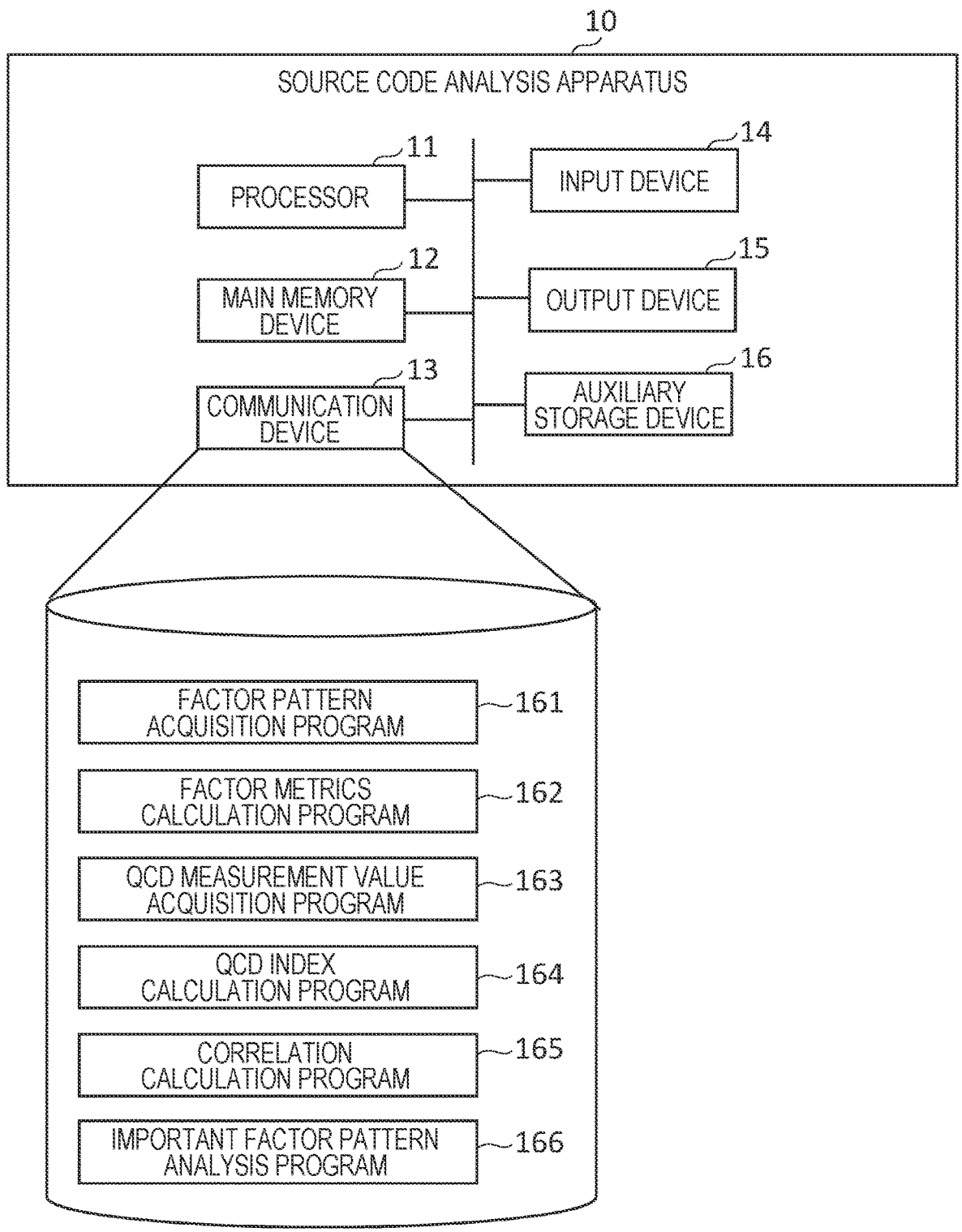
FIG. 2 is a hardware and software configuration diagram of the source code analysis apparatus.
Figure 3:
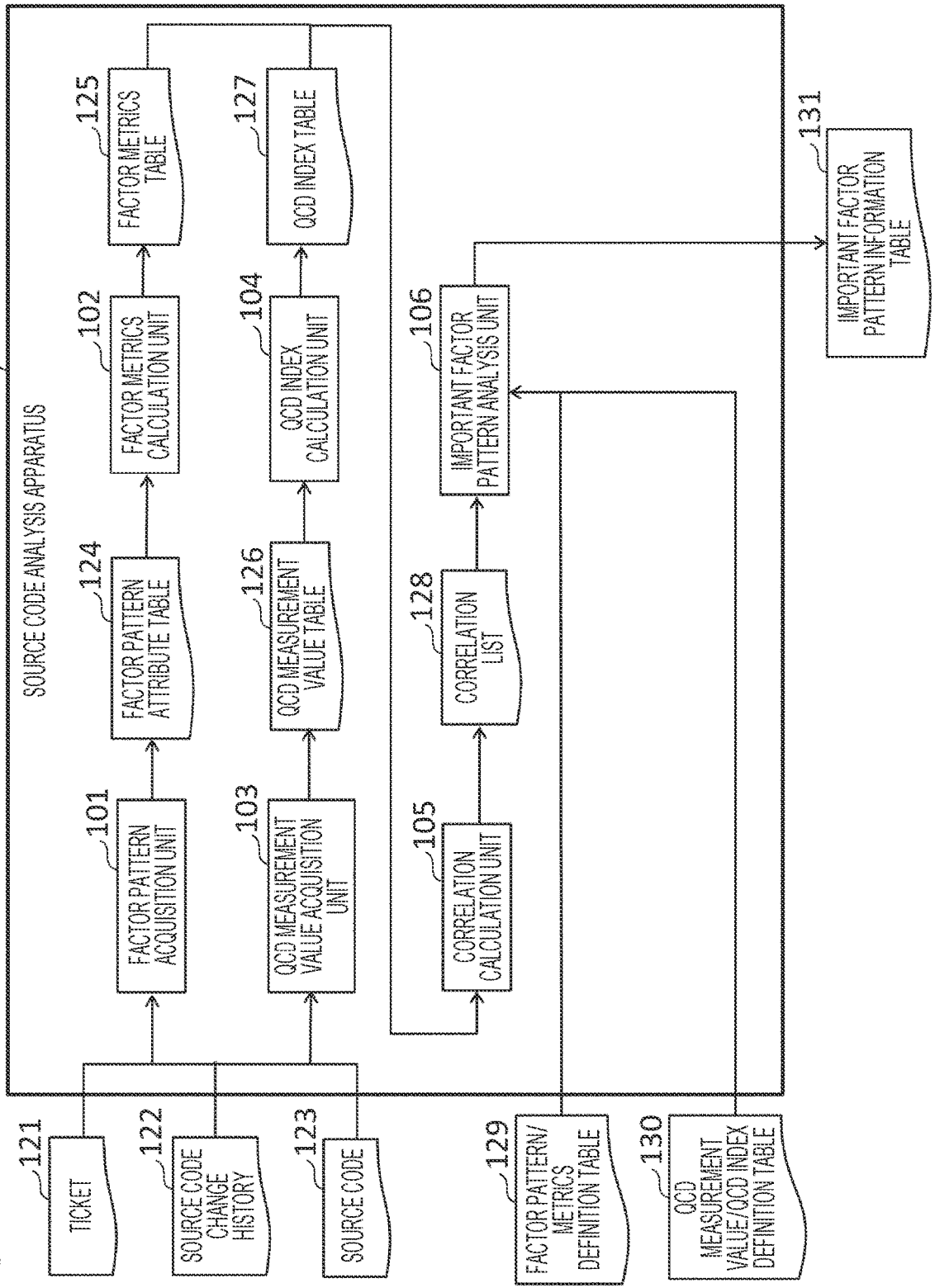
FIG. 3 is a data flow diagram in the source code analysis apparatus according to the first embodiment.

As illustrated in FIG. 2, the source code analysis apparatus 10 includes, for example, a processor 11, a main memory device 12, a communication device 13, an input device 14, an output device 15, and the auxiliary storage device 16. These components are connected so as to be able to communicate with each other via a communication means such as a bus.

The processor 11 is a logic circuit realized by a semiconductor device such as a central processing unit (CPU) or a micro processing unit (MPU), for example. The processor 11 reads and executes the program stored in the main memory device 12, thereby realizing various functions of the source code analysis apparatus 10.

The main memory device 12 is a semiconductor device that temporarily stores programs and data, and is, for example, a random access memory (RAN), a non-volatile semiconductor memory (non-volatile RAM (NVRAM)), or the like.

The communication device 13 is a device that realizes a wired or wireless communication interface for realizing communication with other devices via a communication means such as a LAN or the Internet, and is, for example, a network interface card (NIC), a wireless communication module, a universal serial interface (USB) module, a serial communication module, or the like.

The input device 14 is a device that inputs information to the source code analysis apparatus 10, and is, for example, a keyboard, a mouse, a touch panel, a card reader, a voice input device, or the like. The output device 15 is a device that realizes a user interface for providing various types of information such as a processing progress and a processing result in the source code analysis apparatus 10 to the user, and is, for example, a screen display device (liquid crystal monitor, liquid crystal display (LCD), graphic card, and the like), a voice output device (such as a speaker), a printing device, or the like. Note that, for example, the source code analysis apparatus 10 may be configured to input and output information to and from other devices via the communication device 13.

The auxiliary storage device 16 is, for example, a hard disk drive (HDD), a solid state drive (SSD), an optical storage device (Compact Disc (CD), Digital Versatile Disc (DVD), and the like), a storage system, an IC card, a reading/writing device of a recording medium such as an SD memory card or an optical recording medium, a storage area of a cloud server, or the like. Programs and data stored in the auxiliary storage device 16 are loaded into the main memory device 12 as needed.

In the auxiliary storage device 16 of the source code analysis apparatus 10 of the present embodiment, a factor pattern acquisition program 161, a factor metrics calculation program 162, a QCD measurement value acquisition program 163, a QCD index calculation program 164, a correlation calculation program 165, and an important factor pattern analysis program 166 are installed.

The factor pattern acquisition program 161, the factor metrics calculation program 162, the QCD measurement value acquisition program 163, the QCD index calculation program 164, the correlation calculation program 165, and the important factor pattern analysis program 166 are programs that realize the functions of the factor pattern acquisition unit 101, the factor metrics calculation unit 102, the QCD measurement value acquisition unit 103, the QCD index calculation unit 104, the correlation calculation unit 105, and the important factor pattern analysis unit 106, respectively.

Although not illustrated in FIG. 2, the ticket 121, the source code change history 122, the source code 123, the factor pattern attribute table 124, the factor metrics table 125, the QCD measurement value table 126, the QCD index table 127, the correlation list 128, the factor pattern/factor metrics definition table 129, the QCD measurement value/QCD index definition table 130, and the important factor pattern information table 131 are stored in the auxiliary storage device 16 of the source code analysis apparatus 10 of the present embodiment.

In the present embodiment, an example has been described in which the functions are realized by loading the program installed in the auxiliary storage device 16 and executing the program by the processor 11, but these functions may be realized by, for example, hardware (ASIC (Application Specific Integrated Circuit) or the like) included in the source code analysis apparatus 10.

Next, an outline and a data flow of processing executed by the source code analysis apparatus 10 according to the first embodiment will be described with reference to FIG. 3. First, as illustrated in FIG. 3, the factor pattern acquisition unit 101 receives the ticket 121, the source code change history 122, and the source code 123, and generates the factor pattern attribute table 124. The ticket 121 is based on a concept proposed by a development method called ticket development drive, and is data for presenting some problems in software development and a commitment of a software developer. The source code change history 122 is data of a history in which a target source code of software development is newly developed or changed. The factor pattern attribute table 124 is a table that stores various attributes for each factor pattern.

Next, the factor metrics calculation unit 102 receives the information of the factor pattern attribute table 124 and generates the factor metrics table 125. The factor metrics table 125 is a table that stores, for each program element, a measured value for software evaluation based on the attribute of the factor pattern stored in the factor pattern attribute table 124 as factor metrics.

The QCD measurement value acquisition unit 103 receives the ticket 121, the source code change history 122, and the source code 123, and generates the QCD measurement value table 126. The QCD measurement value table 126 is a table for storing the QCD measurement values to be evaluated from the viewpoint of the quality, cost, and delivery (QCD) of a program.

Next, the QCD index calculation unit 104 receives the information of the QCD measurement value table 126 and generates the QCD index table 127. The QCD index table 127 is a table that stores an index based on the QCD measurement value stored in the QCD measurement value table 126 for each program element.

Next, the correlation calculation unit 105 receives the information of the factor metrics table 125 and the QCD index table 127, calculates a correlation coefficient between the factor metrics stored in the factor metrics table 125 and the QCD index stored in the QCD index table 127, and generates the correlation list 128. The correlation list 128 is a list that stores a correlation coefficient between the factor metrics stored in the factor metrics table 125 and the QCD index stored in the QCD index table 127.

Next, the important factor pattern analysis unit 106 receives the information of the correlation list 128, the factor pattern/factor metrics definition table 129, and the QCD measurement value/QCD index definition table 130, calculates a score for evaluating the important factor pattern and a rank of importance of the factor pattern based on the score, and generates the important factor pattern information table 131. The factor pattern/factor metrics definition table 129 is a table for defining types of factor patterns and weights for evaluating factor metrics for the types. The QCD measurement value/QCD index definition table 130 is a table for defining a weight for evaluating the QCD measurement value and the QCD index for the QCD measurement value. The important factor pattern information table 131 is a table that stores a score for evaluating the important factor pattern and a rank of importance of the factor patterns based on the score for each type of factor patterns and each type of QCD measurement values.

Next, a data structure used in the source code analysis apparatus according to the first embodiment will be described with reference to FIGS. 4 to 11.

The factor pattern attribute table 124 is a table that stores various attributes for each factor pattern, and is a table that inputs the ticket 121 of the source code, the source code change history 122, and the source code 123, and stores the information regarding various factor patterns calculated by the factor pattern acquisition unit 101.

As illustrated in FIG. 4, the factor pattern attribute table 124 includes fields of a factor pattern name 124a, a detection ID 124b, a program element 124c, and an attribute value i 124$d_i$ (i=1, 2, . . . ).

The factor pattern name 124a stores the name of the factor pattern targeted by the record. In the detection ID 124b, an identifier for uniquely specifying a detection point is stored. The detection point is recorded as, for example, which line of a program described in a certain file. The program element 124c stores a name or an identifier for identifying a program element to be a detection point. In the attribute value i 124$d_i$, values of various attributes captured for each factor pattern are stored.

Examples of factor patterns include anti-patterns "Shotgun Surgery" (a change on one program is performed simultaneously on a plurality of classes, a plurality of functions, and a method), "Long method" (method that is too long), and "Magic numbers" (numerical values not described are embedded in an algorithm) described in JP 2019-79312 A.

The attribute value of the factor pattern is the number of related program elements, for example, the number of codes in which methods are described in the case of "Long method", the number of times numerical values without description appear in the program in the case of "Magic numbers", and the like. In addition, in the case of a suitable factor pattern, a degree of support, a degree of certainty, a lift value, and the like, which are basket analysis rule evaluation values, can be adopted as the attribute values.

The factor metrics table 125 is a table that stores a measured value as factor metrics for software evaluation based on the attribute of the factor pattern stored in the factor pattern attribute table 124 for each program element, and is a table that stores information calculated in units of program elements by the factor metrics calculation unit 102 with the factor pattern attribute table 124 as an input.

As illustrated in FIG. 5, the factor metrics table 125 includes fields of a program element name 125a and factor metrics i 125$b_i$ (i=1, 2, . . . ).

In the program element name 125a, a name of a program element uniquely specifying the program element of the record is stored. The factor metrics i 125$b_i$ stores a metric value as a measured value related to the factor pattern of a target program element. The factor metrics is a value calculated from attribute values of one or a plurality of factor patterns.

For example, in the case of "Long method", the factor metrics is a value (for example, normalization to a value of 0 to 1, etc.) in which the code number of the comment is excluded, or in consideration of a difference in the number of lines for each file, all the numbers of lines can be compared while the number of characters in one line is constant.

The QCD measurement value table 126 is a table for storing attributes related to the QCD measurement values evaluated from the viewpoint of QCD of the program, inputs the ticket 121, the source code change history 122, and the source code 123 in software development of a source code to be analyzed, and stores attributes related to measurement values related to various qualities, costs, and deliveries calculated by the QCD measurement value acquisition unit 103.

The QCD measurement value table 126 includes fields of a QCD measurement value type 126a, a measurement ID 126b, a program element 126c, and a measurement value i 126$d_i$ (i=1, 2, . . . ).

In the QCD measurement value type 126a, a name named as a QCD measurement value type of the record is stored. In the measurement ID 126b, an identifier for uniquely specifying the measurement target regarding the QCD measurement value type is stored in the record. The program element 126c stores a name or an identifier that uniquely identifies the program element to be measured. In the measurement value i 126$d_i$, the QCD measurement value regarding the QCD measurement value type is stored in the record.

The QCD measurement value is, for example, a lead time measured as a period from a close date and time to a ticket issuing date and time of a program element associated with a ticket. In addition, the QCD measurement value is, for example, the number of defectives generated for a program element associated with a ticket.

The QCD index table 127 is a table for storing an index based on the QCD measurement value stored in the QCD measurement value table 126 as a QCD index for each program element, and stores information calculated in units of program elements by the QCD index calculation unit 104 with the QCD measurement value table 126 as an input.

As illustrated in FIG. 7, the QCD index table 127 includes fields of a program element name 127a and a QCD index i 127$b_i$ (i=1, 2, ... ).

In the program element name 127a, a name of a program element uniquely specifying the program element of the record is stored. The value of the QCD index for the target program element is stored in the QCD index i 127$b_j$. The QCD index is a value calculated from one or a plurality of QCD measurement values, and is, for example, a value obtained by normalizing a value calculated from representative values of a plurality of QCD measurement values.

The correlation list 128 is a list that stores a correlation coefficient between the factor metrics stored in the factor metrics table 125 and the QCD index stored in the QCD index table 127, and stores the information calculated by the correlation calculation unit 105 with the factor metrics table 125 and the QCD index table 127 as inputs.

As illustrated in FIG. 8, the correlation list 128 includes fields of a factor metrics name 128a, a QCD index name 128b, and a correlation coefficient 128c.

The factor metrics name 128a and the QCD index name 128b store the name of the factor metrics and the name of the QCD index to be subjected to correlation analysis, respectively. The correlation coefficient 128c stores the factor metrics of the factor metrics name 128a and a value of a correlation coefficient obtained by performing the correlation analysis on the QCD index of the QCD index name 128b.

The factor pattern/factor metrics definition table 129 is a table for defining types of factor patterns and weights for evaluating factor metrics for the types.

As illustrated in FIG. 9, the factor pattern/factor metrics definition table 129 includes fields of a factor pattern type name 129a, a factor metrics name 129b, and a weight 129c.

In the factor pattern type name 129a and the factor metrics name 129b, the name of the factor pattern type to which a weight is given and the name of the factor metrics are stored. The weight 129c stores a value that defines how to weight and evaluate the factor metrics for each factor pattern type. For example, as the value of the weight 129c having the same factor pattern type name stored in the factor pattern type name 129a, a positive real value is stored such that the sum becomes 1.0.

The QCD measurement value/QCD index definition table 130 is a table for defining a weight for evaluating the QCD measurement value and the QCD index for the QCD measurement value. As illustrated in FIG. 10, the QCD measurement value/QCD index definition table 130 includes fields of a QCD measurement value name 130a, a QCD index name 130b, an influence viewpoint 130c, and a weight 130d.

In each of the QCD measurement value name 130a and the QCD index name 130b, the name of the QCD measurement value for identifying the QCD measurement value for evaluating the weight and the name of the QCD index for identifying the QCD index are stored. In the influence viewpoint 130c, information indicating a type of quality, cost, and delivery is stored as a viewpoint of the QCD index. For example, "Q" is stored if the QCD index indicates one side with quality of software, "C" is stored if the QCD index indicates one side with cost of software, and "D" is stored if the QCD index indicates one side with time required for release of software.

The weight 130d stores the ratio of the QCD index stored in the QCD index name 130b to the QCD measurement value name 130a. For example, the total of the weights of the QCD indexes of the QCD measurement values having the same QCD measurement value name with the QCD measurement value name 130a is allocated as 1.0.

The important factor pattern information table 131 is a table that stores scores for evaluating the important factor patterns and ranks of importance of the factor patterns based on the scores for each type of factor patterns and each type of QCD measurement values, and is a table that inputs the correlation list 128, the factor pattern/factor metrics definition table 129, and the QCD measurement value/QCD index definition table 130 and stores information calculated by the important factor pattern analysis unit 106.

As illustrated in FIG. 11, the important factor pattern information table 131 includes fields of a factor pattern type name 131a, a QCD measurement value name 131b, an influence viewpoint 131c, a score 131d, and a rank 131e.

In each of the factor pattern type name 131a and the QCD measurement value name 131b, the name of the factor pattern type and the name of the QCD measurement value, which are targets for calculating the score, are stored. Similar to the QCD measurement value/QCD index definition table 130, the influence viewpoint 131c stores information indicating a type of quality, cost, and delivery as the viewpoint of the QCD index. The score 131d stores a correlation coefficient for a pair of the factor pattern type and the QCD measurement value calculated so far, a defined weight for a pair of the factor pattern type and the factor metrics, the defined QCD measurement value, and a score for evaluating an influence in software development on the pair of the factor pattern type and the QCD measurement value calculated on the basis of the weight for the pair of the QCD index. In the rank 131e, the rank of influence in software development for the pair of the factor pattern type and the QCD measurement value viewed from the value of the score 131d is stored.

Next, processing performed by the source code analysis apparatus according to the first embodiment will be described with reference to FIGS. 12 to 17.

Figure 12:
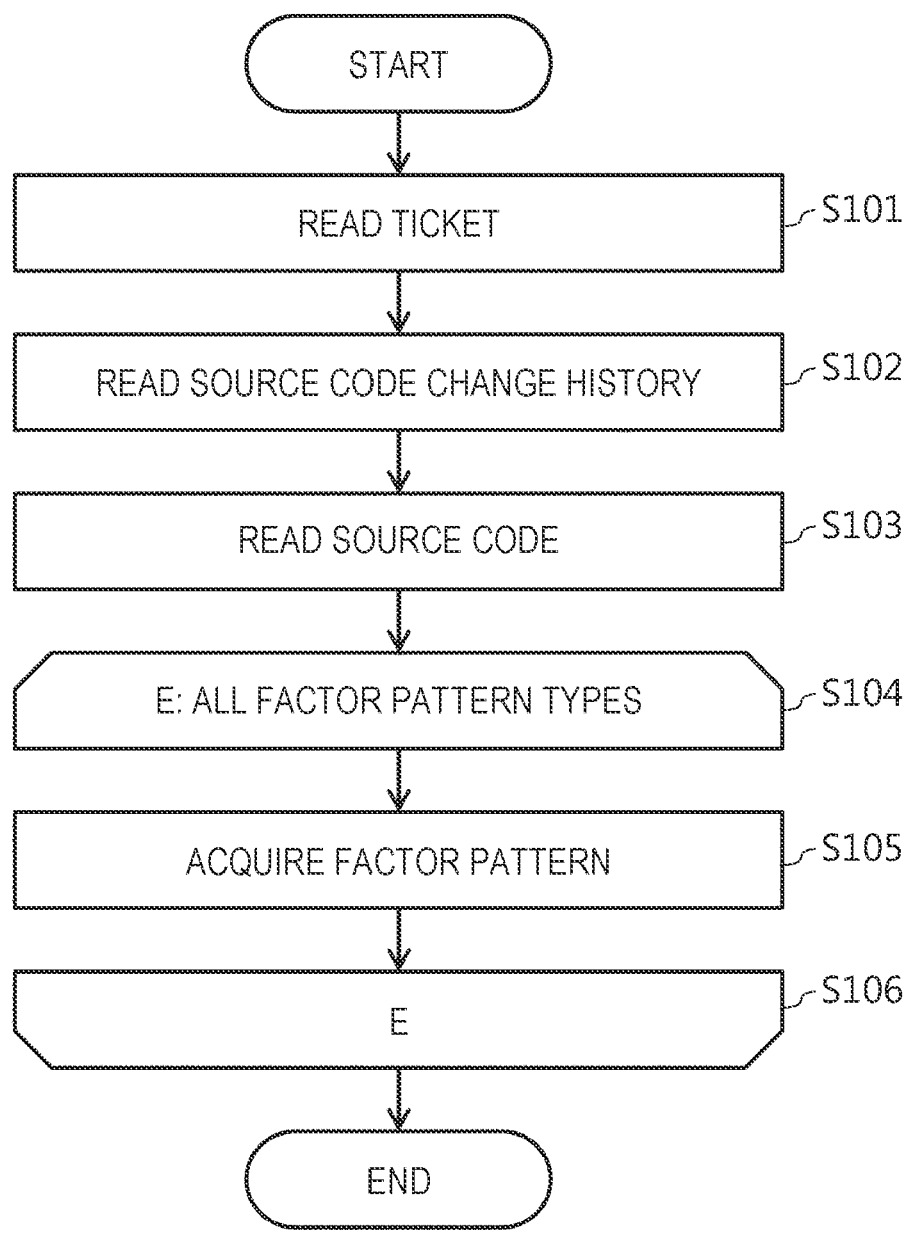
FIG. 12 is a flowchart illustrating factor pattern acquisition processing.

First, the factor pattern acquisition processing will be described with reference to FIG. 12.

First, the factor pattern acquisition unit 101 of the source code analysis apparatus 10 reads the ticket 121 associated with the analysis target program (S101).

Next, the source code change history 122 of the analysis target program is read (S102).

Next, the source code 123 of the analysis target program is read (S103).

Next, for all factor pattern types E (S104 to S106), the factor patterns are acquired on the basis of the ticket 121, the source code change history 122, and the source code 123 which are read (S105), and necessary information is stored in factor pattern attribute table 124. Existing software analysis tools can be used to acquire factor patterns.

Figure 13:
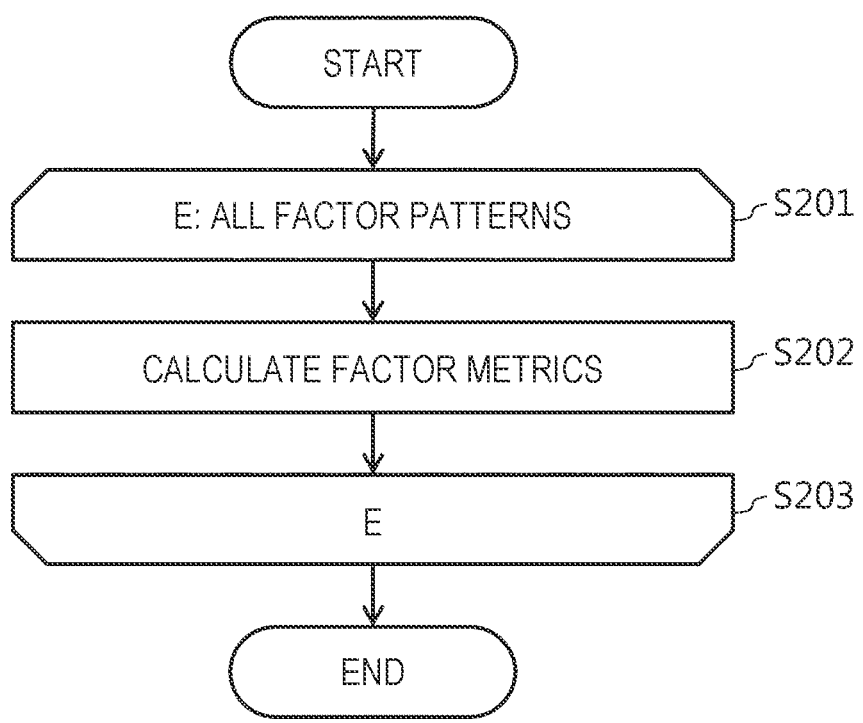
FIG. 13 is a flowchart illustrating factor metrics calculation processing.

Next, factor metrics calculation processing will be described with reference to FIG. 13.

The factor metrics calculation unit 102 of the source code analysis apparatus 10 calculates factor metrics for all factor pattern types E (S201 to S203) on the basis of the information stored in the factor pattern attribute table 124 (S202).

Figure 14:
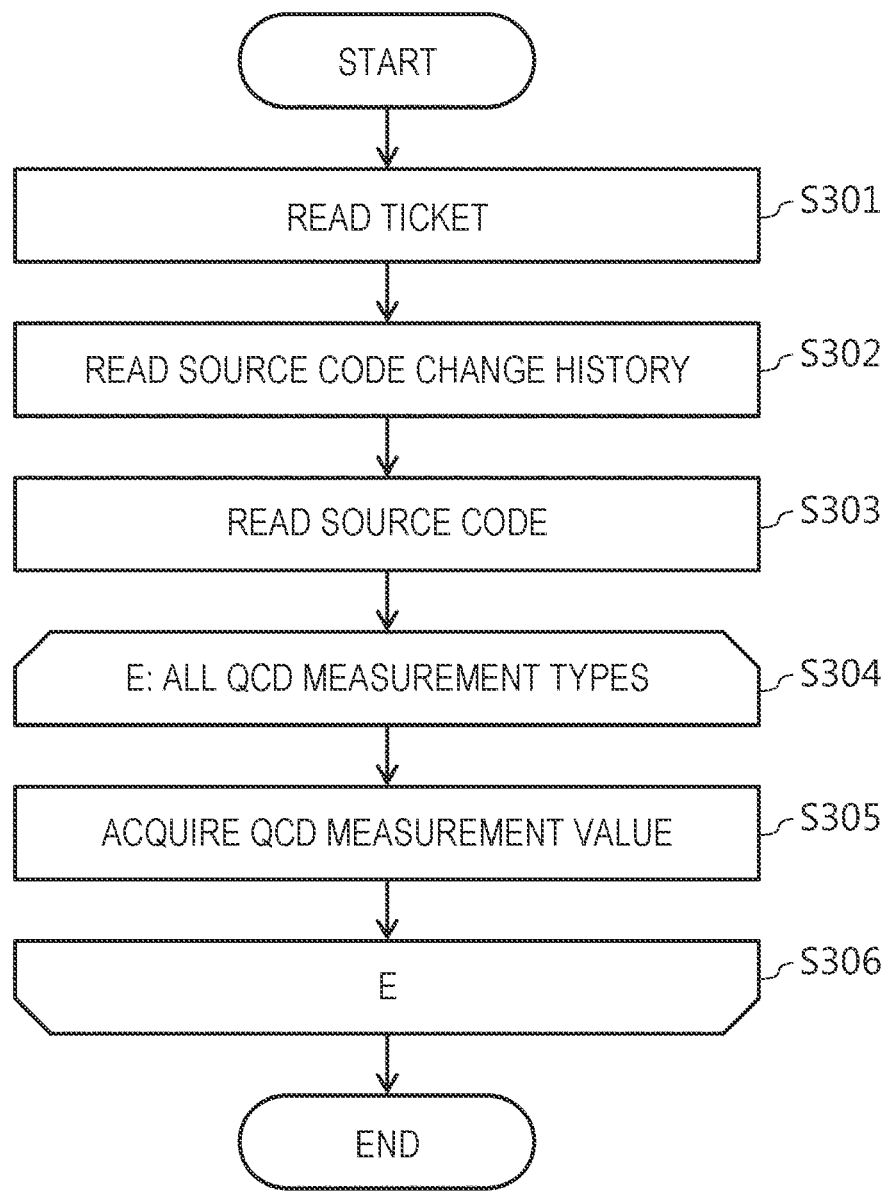
FIG. 14 is a flowchart illustrating QCD measurement value acquisition processing.

Next, QCD measurement value acquisition processing will be described with reference to FIG. 14.

First, the QCD measurement value acquisition unit 103 of the source code analysis apparatus 10 reads the ticket 121 associated with the analysis target program (S301).

Next, the source code change history 122 of the analysis target program is read (S302).

Next, the source code 123 of the analysis target program is read (S303).

Next, for all QCD measurement types E (S304 to S306), QCD measurement values are acquired (S305), and information is stored in the QCD measurement value table 126 illustrated in FIG. 6. The QCD measurement value can be acquired using an existing software development management tool.

Figure 15:
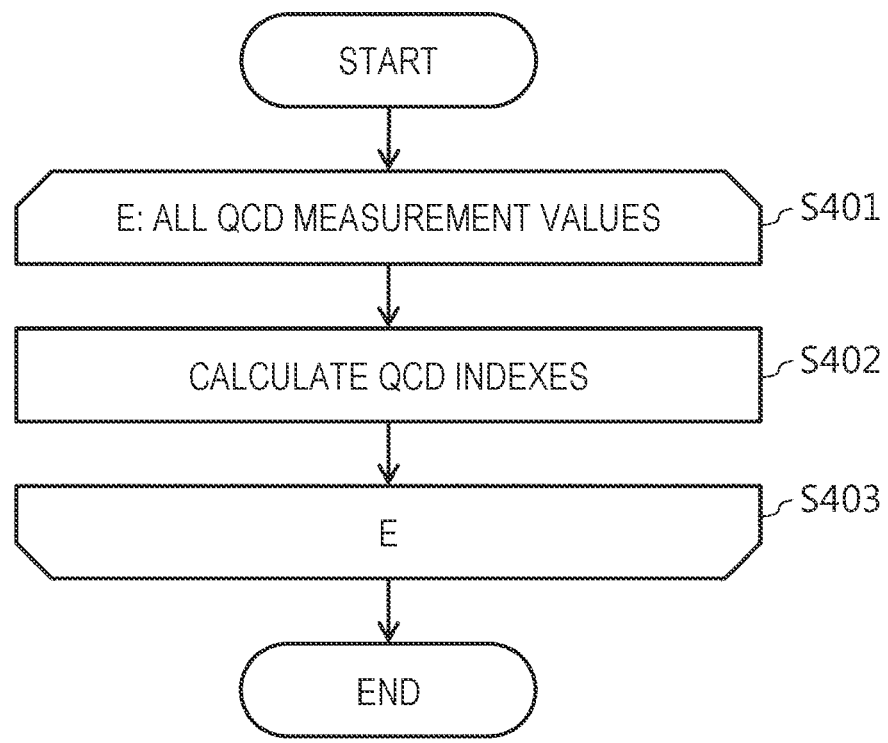
FIG. 15 is a flowchart illustrating QCD index calculation processing.

Next, QCD index calculation processing will be described with reference to FIG. 15.

The QCD index calculation unit 104 of the source code analysis apparatus 10 calculates the QCD index based on the information stored in the QCD measurement value table 126 (S401 to S402) for all the QCD measurement values E stored in the QCD measurement value table 126 (S402), and stores the QCD index in the QCD index table 127 illustrated in FIG. 7.

Figure 16:
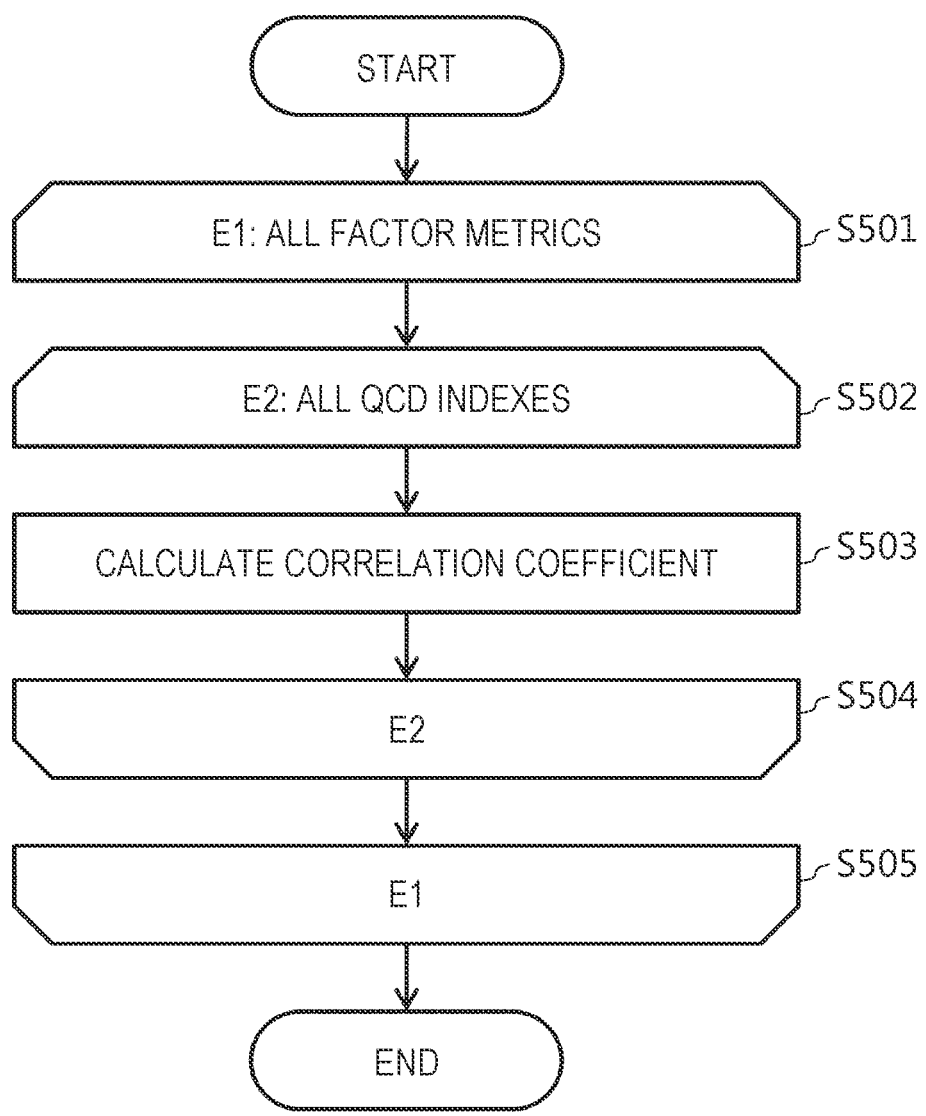
FIG. 16 is a flowchart illustrating correlation calculation processing.

Next, correlation calculation processing will be described with reference to FIG. 16.

The correlation calculation unit 105 of the source code analysis apparatus 10 performs the processing of S501 to S504 on all the factor metrics E1 (S502 to S505).

In the loop of S501 to S505, the correlation coefficient of the factor metrics E1 and the QCD index E2 is calculated for all the QCD indexes E2 (S502 to S10) (S503). For example, the correlation calculation unit 105 calculates a correlation coefficient using Spearman's rank correlation coefficient. The Spearman's rank correlation coefficient is an index for determining a correlation when two variables are rank data, and is evaluated as follows. The scores of the factor metrics and the QCD index serving as the original data are converted into ranks, and a difference D between the ranks of the two variables in each pair is calculated. At this time, the Spearman's rank correlation coefficient is given by the following (Expression 1).

[Math. 1]

$$\rho = 1 - \frac{6 \sum D^2}{N^3 - N} \quad \text{(Formula 1)}$$

Here, ρ represents a Spearman's rank correlation coefficient regarding the factor metrics and the QCD index, D represents a difference in rank between the factor metrics value and the value of the QCD index, N represents the number of pairs of values, and Σ represents a sum of differences in rank between the factor metrics value and the value of the QCD index of all the pairs of the factor metrics value and the QCD index. There is an advantage that the Spearman's rank correlation coefficient can be applied even when variables do not follow a distribution such as a normal distribution.

In addition, for example, the correlation calculation unit 105 calculates the correlation coefficient after performing outlier removal using a box plot on the input factor metrics table 125. In addition, the correlation calculation unit 105 calculates a correlation coefficient after performing outlier removal using a box plot on the input QCD index table 127, for example. In addition, for example, the correlation calculation unit 105 calculates a correlation coefficient after normalizing the value by dividing the metric value by (maximum value of the metric value−minimum value of the metric value) with respect to the input factor metrics table 125. For example, the correlation calculation unit 105 calculates a correlation coefficient after normalizing the value by dividing the QCD index value by (maximum value of the QCD index value−minimum value of the QCD index value) with respect to the input QCD index table 127.

Figure 17:
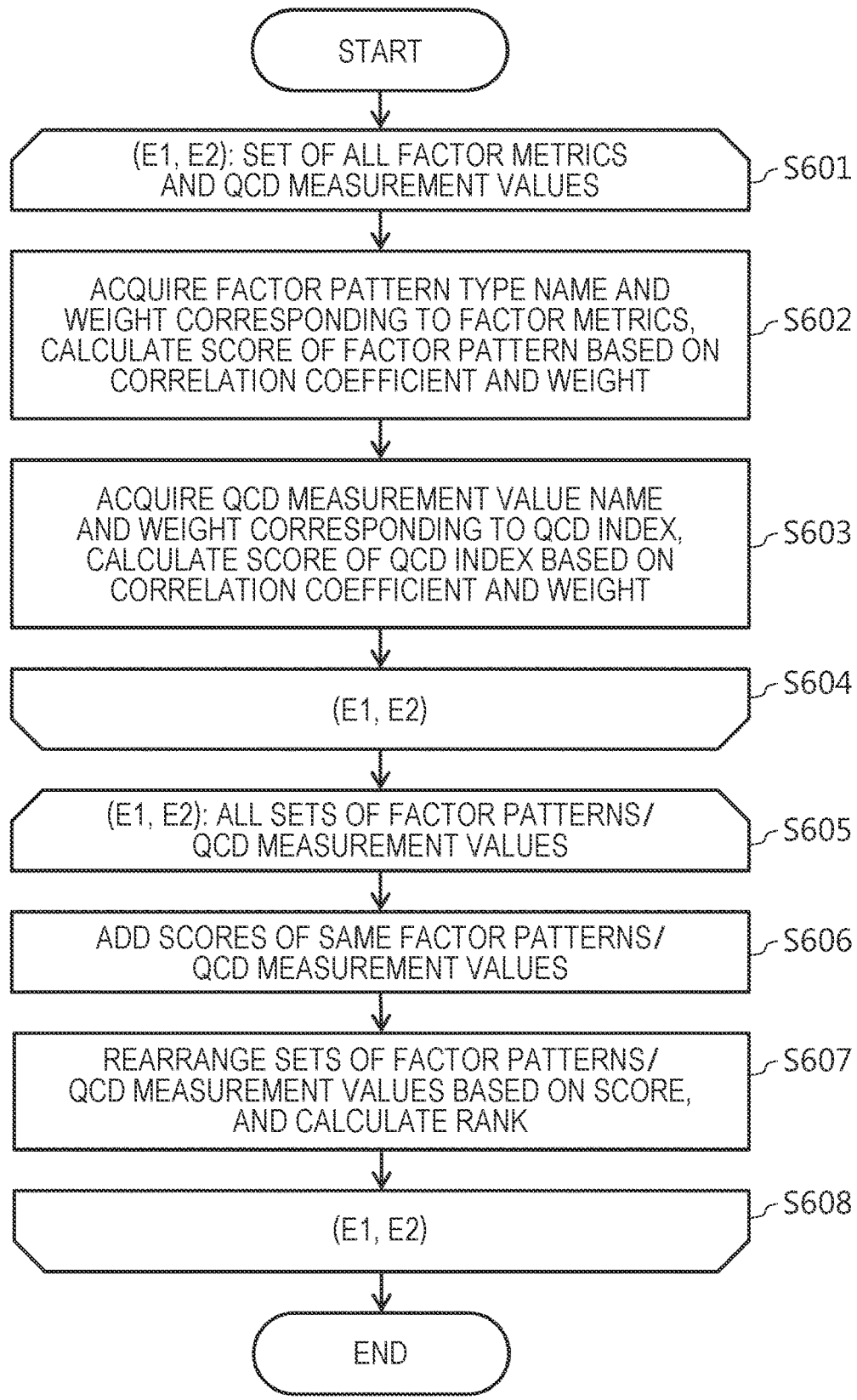
FIG. 17 is a flowchart illustrating important factor pattern analysis processing.

Next, the important factor pattern analysis processing will be described with reference to FIG. 17.

The important factor pattern analysis unit 106 of the source code analysis apparatus 10 executes S602 and S603 on all sets (E1, E2) of the factor metrics E1 and the QCD measurement values E2 (S601 to S604).

In the loop of S601 to S604, the factor pattern type name and weight of the factor pattern/factor metrics definition table 129 corresponding to the factor metrics E1 are acquired, and the score of the factor pattern is calculated on the basis of the correlation coefficient stored in the correlation list 128 and the acquired weight (S602). The score of the factor pattern is calculated by, for example, a product of the correlation coefficient of the factor metrics of the factor pattern and the weight.

Next, the QCD measurement value name and weight corresponding to the QCD index E2 are acquired from the QCD measurement value/QCD index definition table 130, and the score of the QCD index is calculated based on the correlation coefficient stored in the correlation list 128 and the acquired weight (S603). The score of the QCD index is calculated by, for example, a product of the correlation coefficient and the weight of the QCD index.

Next, for all the sets (E1, E2) of factor patterns and QCD measurement values (S605 to S608), the sum of the scores of the factor patterns having the same factor pattern E1 and QCD measurement value E2 and the score of the QCD index is added up for the sets (E1, E2) (S605) and stored in the important factor pattern information table 131. The adding method is, for example, summing. In addition, for example, the value is processed such that a positive value represents a good influence, a negative value represents a bad influence, a maximum value is 100, and a minimum value is −100.

A rank is calculated by rearranging the sets (E1, E2) of factor patterns and QCD measurement values in descending order of the summed scores (that is, the higher the score, the higher the rank) (S607) and stored in the important factor pattern information table 131.

Next, a user interface provided by the source code analysis apparatus will be described with reference to FIG. 18.

Figure 18:
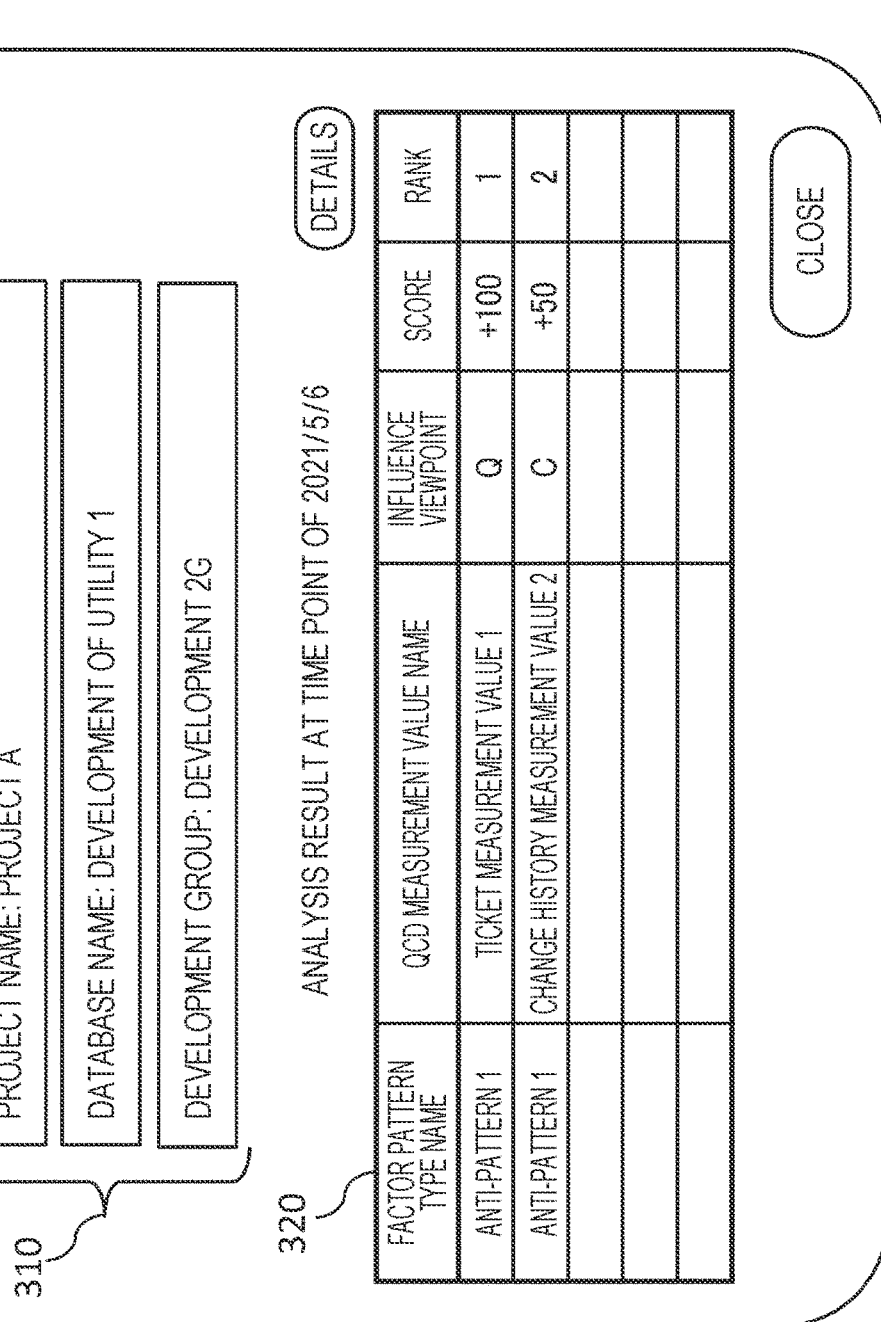
FIG. 18 is a diagram illustrating an example of an important factor pattern evaluation screen.

FIG. 18 is a diagram illustrating an example of the important factor pattern evaluation screen.

The source code analysis apparatus 10 displays an important factor pattern evaluation screen 300 as illustrated in FIG. 18 on a display device such as a display as an analysis result of the source code.

The important factor pattern evaluation screen 300 has a development project display area 310 and an important factor pattern information display area 320.

In the development project display area 310, information on related projects is displayed. The information of the important factor pattern information table 131 is displayed in the important factor pattern information display area 320.

Second Embodiment

Hereinafter, a second embodiment according to the present invention will be described with reference to FIGS. 19 to 30.

In the first embodiment, an example of a source code analysis apparatus has been described in which correlation analysis of a pattern in software development and a measurement value in the QCD of software development is performed, and a pair of the pattern in software development and the measurement value in the QCD of software development is scored, so that the source code analysis apparatus is presented to a software developer.

In the present embodiment, on the premise of the first embodiment, a method of time-delayed correlation analysis is also incorporated, and a pair of a pattern in software development and a measurement value in the QCD of software development is scored by a time-delayed correlation coefficient expressed by an add coefficient, a delta coefficient, and a delay coefficient instead of the correlation coefficient of the first embodiment.

Hereinafter, differences from the first embodiment will be mainly described.

First, the concept of the time-delayed correlation analysis will be described with reference to FIG. 19.

Figure 19:
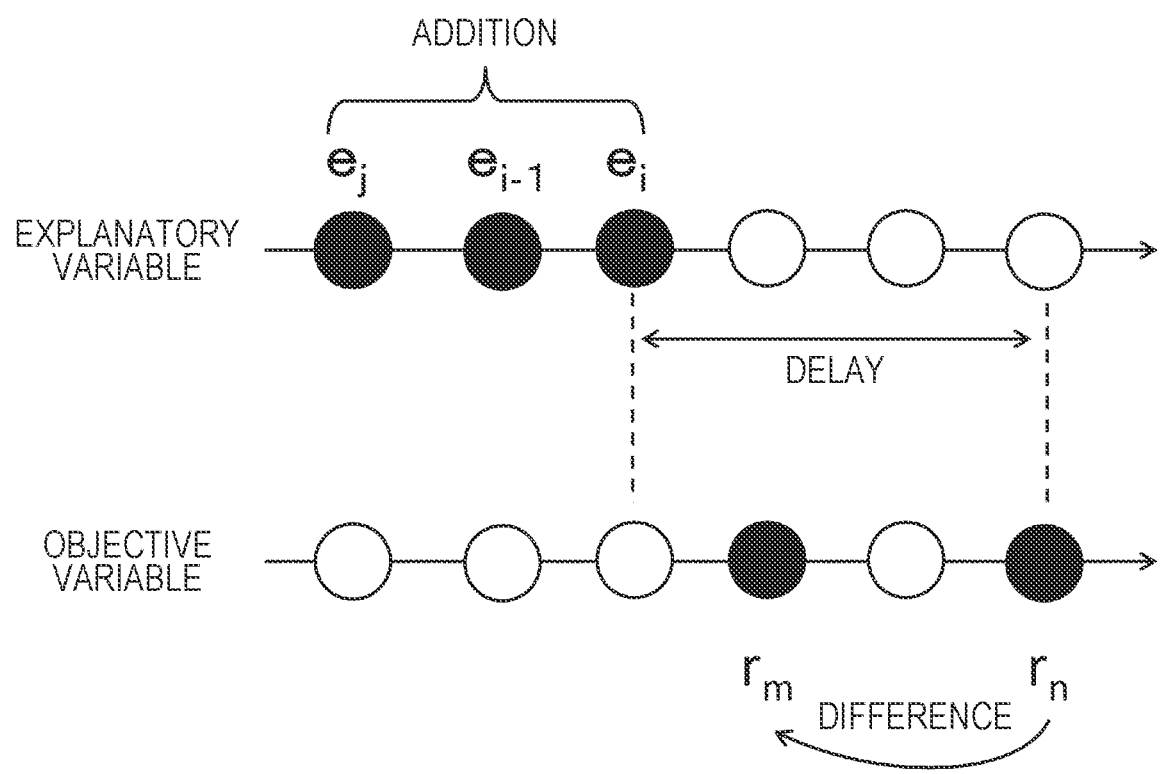
FIG. 19 is a diagram for explaining a concept of time-delayed correlation analysis.

FIG. 19 is a diagram for explaining the concept of the time-delayed correlation analysis.

The time-delayed correlation analysis is a method of correlation analysis in consideration of a temporal order, and is a method of preparing two pieces of time-series data and searching for an observation relationship while delaying time. In the time-delayed correlation analysis, one time-series data is set as an objective variable, the other time-series data is set as an explanatory variable, and a correlation between an average value of the explanatory variable in a certain period and a change amount of the objective variable is obtained.

Note that an example of using time-delayed correlation analysis for software development is described in "Data mining method for understanding co-evolution of OSS system and community" (Yamatani et al., Journal of Information Processing Society of Japan, Vol. 56, No. 1, 2015).

Now, as illustrated in FIG. 19, $e_i$ is an explanatory variable at time i, and $r_n$ is an objective variable at time n.

In the time-delayed correlation analysis, in order to express that the values of the explanatory variables are accumulated and the change in the value of the objective variable is affected by a delay of a certain period, three parameters of an add coefficient (a period in which the values of the explanatory variables are accumulated: i-j), a delta coefficient (a period in which the change in the value of the objective variable is considered: n-m), and a delay coefficient (a period until the explanatory variable affects the objective variable: n-i) are defined, and processing of obtaining optimum values of these three parameters is performed so that the correlation coefficient is maximized (details will be described later).

When the cumulative value of the values of the explanatory variables in a certain add coefficient (i-j) is $e_{ij}$, $e_{ij}$ is defined by the following (Expression 2).

[Math. 2]

$$e_{ij} = \frac{e_i + e_{i-1} + \ldots + e_j}{i - j + 1} \quad \text{(Formula 2)}$$

In addition, when a change value of the value of the objective variable in a certain delta coefficient (n-m) is $r_{nm}$, $r_{nm}$ is defined by the following (Expression 3).

[Math. 3]

$$r_{nm} = r_n - r_m \quad \text{(Formula 3)}$$

The time-delayed correlation coefficient $c_{er}$ is defined by the following (Expression 4).

[Math. 4]

$$C_{er} = \frac{S_{er}}{S_e S_r} \quad \text{(Formula 4)}$$

Here, $S_e$ and $S_r$ are standard deviations of $e_{ij}$ and $r_{nm}$, respectively, and $S_{er}$ is a covariance of $e_{ij}$ and $r_{nm}$.

As described above, the time-delayed correlation analysis is a correlation analysis method assuming that a change is given to the value of the objective variable after a certain period as a result of accumulating the values of the explanatory variables.

Next, the configuration of the source code analysis apparatus and the outline of processing executed by the source code analysis apparatus will be described using FIGS. 20 and 21.

Figure 20:
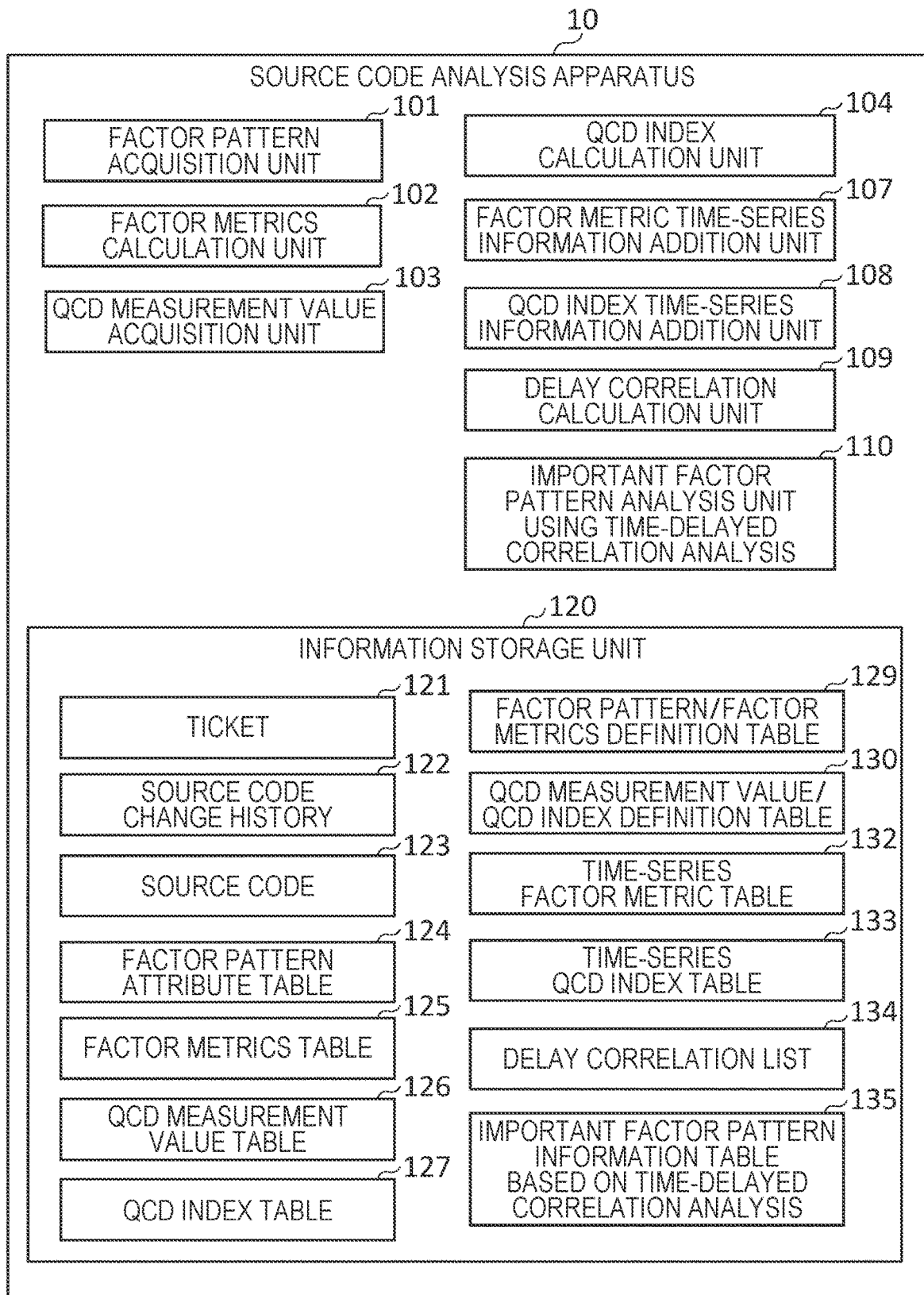
FIG. 20 is a functional configuration diagram of a source code analysis apparatus according to a second embodiment.

FIG. 20 is a functional configuration diagram of the source code analysis apparatus according to the second embodiment.

Figure 21:
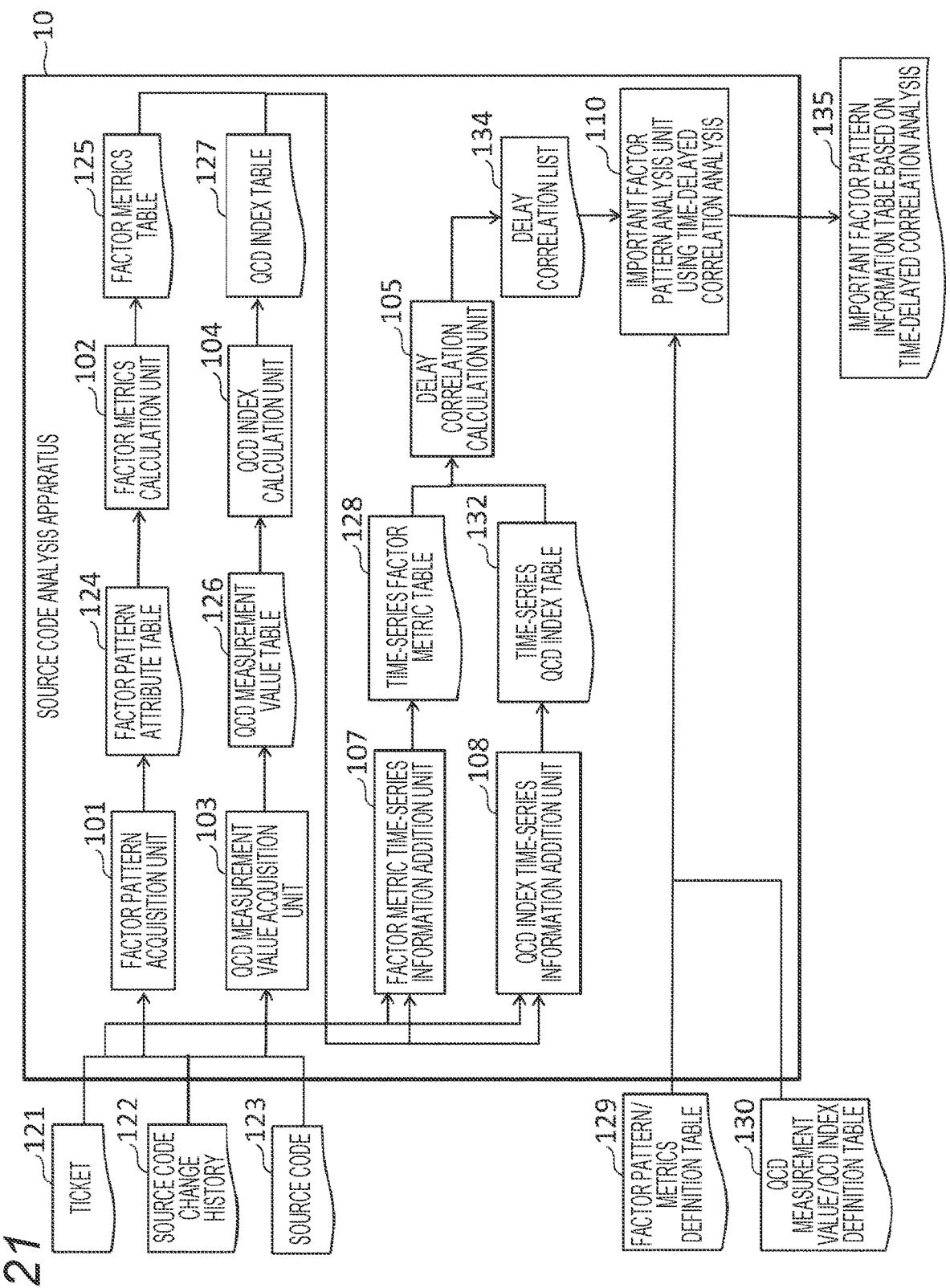
FIG. 21 is a data flow diagram in the source code analysis apparatus according to the second embodiment.

FIG. 21 is a data flow diagram in the source code analysis apparatus according to the second embodiment.

As illustrated in FIG. 20, in the source code analysis apparatus 10 of the present embodiment, as compared with the source code analysis apparatus 10 of the first embodiment, the correlation calculation unit 105 is eliminated, and a factor metrics time-series information addition unit 107, a QCD index time-series information addition unit 108, a delay correlation calculation unit 109, and an important factor pattern analysis unit 110 by time-delayed correlation analysis are added as functional units.

The factor metrics time-series information addition unit 107 is a functional unit that adds an occurrence time point of the factor pattern for which the factor metrics are measured to each record of the factor metrics table 125. The QCD index time-series information addition unit 108 is a functional unit that adds the occurrence time point of the event related to the QCD measurement value which is the basis of the calculation of the QCD index to each record of the QCD index table 127. The delay correlation calculation unit 109 is a functional unit that receives information of a time-series factor metrics table 132 and a time-series QCD index table 133 and generates a delay correlation list 134. The important factor pattern analysis unit 110 by time-delayed correlation analysis is a functional unit that receives information of the delay correlation list 134, the factor pattern/factor metrics definition table 129, and the QCD measurement value/QCD index definition table 130 in addition to the function of the important factor pattern analysis unit 106 of the first embodiment, and generates an important factor pattern information table 135 by time-delayed correlation analysis.

In addition, regarding the data stored in the information storage unit 120, the correlation list 128 and the important factor pattern information table 131 are eliminated, and the time-series factor metrics table 132, the time-series QCD index table 133, the delay correlation list 134, and the important factor pattern information table 135 by time-delayed correlation analysis are added.

The time-series factor metrics table 132 is a table in which a field of a time point is added to the factor metrics table 125. The time-series QCD index table 133 is a table in which a field of a time point is added to the QCD index table 127. The delay correlation list 134 is a list that stores coefficients related to time-delayed correlation analysis between factor metrics and QCD indexes.

Next, an outline and a data flow of processing executed by the source code analysis apparatus 10 according to the second embodiment will be described with reference to FIG. 21.

Similarly to the first embodiment, the ticket 121, the source code change history 122, and the source code 123 are input to the source code analysis apparatus 10. Processing of the factor pattern acquisition unit 101, the factor metrics calculation unit 102, the QCD measurement value acquisition unit 103, and the QCD index calculation unit 104 is also similar to that of the first embodiment.

In the present embodiment, in addition to the case of the first embodiment, in the source code analysis apparatus 10, the factor metrics time-series information addition unit 107 receives the ticket 121, the source code change history 122, the source code 123, and the factor metrics table 125, and generates the time-series factor metrics table 132. The QCD index time-series information addition unit 108 receives the ticket 121, the source code change history 122, the source code 123, and the QCD index table 127, and generates the time-series QCD index table 133. Further, instead of the correlation calculation unit 105 described in the first embodiment, the delay correlation calculation unit 109 receives the time-series factor metrics table 132 and the time-series QCD index table 133 and generates the delay correlation list 134. Then, instead of the important factor pattern analysis unit 106 described in the first embodiment, the important factor pattern analysis unit 110 based on the time-delayed correlation analysis receives the delay correlation list 134 and generates the important factor pattern information table 135 based on the time-delayed correlation analysis.

Next, a data structure used in the source code analysis apparatus of the second embodiment will be described with reference to FIGS. 22 to 25.

The time-series factor metrics table 132 is a table that stores, for each program element, an occurrence time point of a factor pattern for which factor metrics are measured, and a measured value for software evaluation based on an attribute of the factor pattern stored in the factor pattern attribute table 124 as factor metrics, and includes fields of a program element name 132a, a time point 132b, and factor metrics i $132c_i$ (i=1, 2, . . . ) as illustrated in FIG. 22.

The program element name 132a and the factor metrics i $132c_i$ are similar to the program element name 125a and factor metrics i $125b_i$ (i=1, 2, . . . ) of the factor metrics table 125, respectively.

The time point 132b stores the time point at which the factor pattern in which the factor metrics of the record are measured occurs, and is, for example, time information at the time of changing the program or updating the ticket. The information of the time point 132b is recorded, for example, in units according to the measurement interval, such as year, month, week, day, and hour according to the measurement interval. In addition, the recording form of the time point 132b may be recorded as an actual date or time, or may be recorded as a next number of measurement.

The time-series QCD index table 133 is a table that stores, for each program element, an occurrence time point of an event in which the QCD measurement value stored in the original QCD measurement value table 126 is measured and an index based on the QCD measurement value, and includes fields of a program element name 133a, a time point 133b, and a QCD index i $133c_i$ (i=1, 2, . . . ) as illustrated in FIG. 23.

As illustrated in FIG. 7, the QCD index table 127 of the program element name 133a and the QCD index i $133c_i$ is similar to the program element name 127a and the QCD index i $127b_i$.

The time point 133b stores an occurrence time point of an event obtained by measuring an original QCD measurement value for calculating the QCD index of the record, and is time information such as a time point at which a defect occurs, a time point at which a problem of program development is clarified by a ticket, and a time point at which a process delay occurs. The time point 133b is recorded, for example, in units according to the measurement interval such as year, month, week, day, and hour according to the measurement interval. The recording form of the time point 133b may be recorded as an actual date or time, or may be recorded as a next number of measurement.

The delay correlation list 134 is a list that stores coefficients related to time-delayed correlation analysis between factor metrics and QCD indexes, and includes fields of a factor metrics name 134a, a QCD index name 134b, an add coefficient 134c, a delta coefficient 134d, a delay coefficient 134e, and a time-delayed correlation coefficient 134f as illustrated in FIG. 24.

The factor metrics name 134a and the QCD index name 134b are similar to the factor metrics name 128a and the QCD index name 128b of the correlation list 128, respectively. The add coefficient 134c, the delta coefficient 134d, the delay coefficient 134e, and the time-delayed correlation coefficient 134f store values of the add coefficient, the delta coefficient, the delay coefficient, and the time-delayed correlation coefficient in the above-described time-delayed correlation analysis for the pair of the factor metrics and the QCD index of the record.

The important factor pattern information table 135 by the time-delayed correlation analysis is a table that stores a score for evaluating the important factor pattern calculated by the result of the time-delayed correlation analysis and the rank of importance of the factor pattern based on the score for each type of the factor pattern and type of the QCD measurement value. As illustrated in FIG. 25, the important factor pattern information table includes fields of a factor pattern type name 135a, a QCD measurement value name 135b, an influence viewpoint 135c, a score 135d, and an influence period 135e.

The factor pattern type name 135a, the QCD measurement value name 135b, and the influence viewpoint 135c are similar to the factor pattern type name 131a, the QCD measurement value name 131b, and the influence viewpoint 131c of the important factor pattern information table 131, respectively. The score 135d is semantically the same as the score 131d of the important factor pattern information table 131, but in the present embodiment, the value of the score calculated based on the data of the result of the time-delayed correlation analysis is stored in the score 135d. The influence period 135e stores the influence period of the factor metrics (explanatory variable) and the QCD index (objective variable) calculated from the coefficient of the time-delayed correlation analysis for the pair of the factor pattern type and the QCD measurement value related to the record.

Next, processing performed by the source code analysis apparatus according to the second embodiment will be described with reference to FIGS. 26 to 30.

First, factor metrics time-series information addition processing will be described with reference to FIG. 26.

The factor metrics time-series information addition unit 107 of the source code analysis apparatus 10 acquires the occurrence time point of the factor pattern for which the factor metrics are measured to all the program elements E (S801 to S803), and stores the occurrence time point in the time-series factor metrics table 132 (S802).

The occurrence time point of the factor pattern for which the factor metrics are measured can be extracted from the time information of the ticket 121, the source code change history 122, and the source code 123. In addition, when the factor pattern acquisition unit 101 acquires the information of the factor pattern, the information may be transferred to the factor metrics time-series information addition unit 107. In addition, the user may give information regarding a time point from the outside with a keyboard, or may give a correspondence table between factor metrics and a time point.

Figure 27:
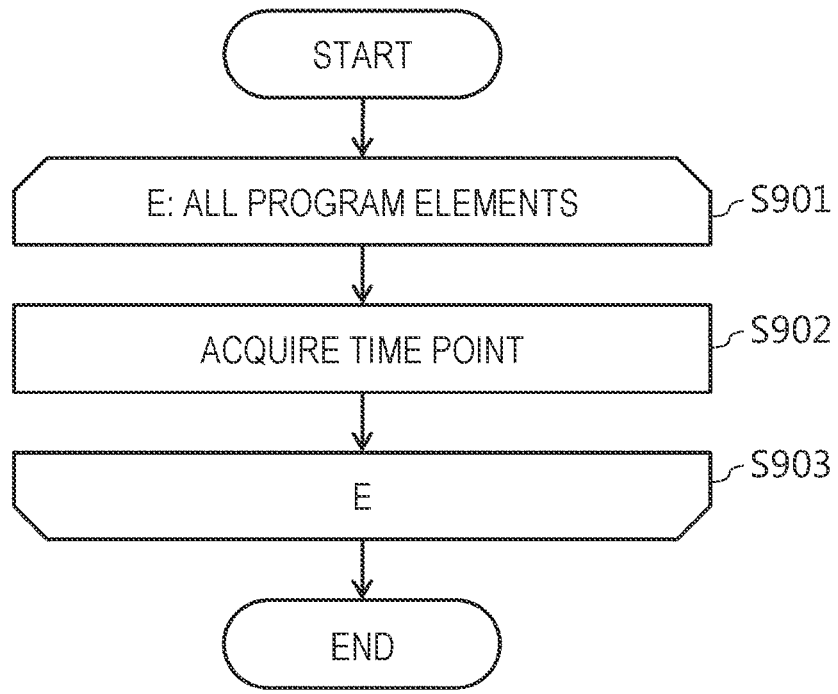
FIG. 27 is a flowchart illustrating QCD index time-series information addition processing.

Next, the QCD index time-series information addition processing will be described with reference to FIG. 27.

The QCD index time-series information addition unit 108 of the source code analysis apparatus 10 acquires the occurrence time point of the event related to the QCD measurement value, which is the basis of the calculation of the QCD index, for all the program elements E (S901 to S903) and stores the occurrence time point in the time-series QCD index table 133 (S902).

The occurrence time point of the event related to the QCD measurement value which is the basis of the calculation of the QCD index can be extracted from the time information of ticket 121, the source code change history 122, and the source code 123. In addition, when the QCD index calculation unit 104 calculates the QCD index, the QCD index time-series information addition unit 108 may receive the information of the occurrence time point of the event related to the QCD measurement value. In addition, the user may give the information of the time point from the outside with a keyboard, or may give the QCD index and the correspondence table of the time point.

Next, time-delayed correlation calculation processing will be described with reference to FIG. 28.

The delay correlation calculation unit 109 of the source code analysis apparatus 10 performs the processing of S1001 to S1004 on all the factor metrics E1 (S1002 to S1005).

In the loop of S1001 to S1005, the time-delayed correlation coefficient calculation processing is performed on all the QCD indexes E2 (S1002 to S1004) (S1003). Details of the time-delayed correlation coefficient calculation processing will be described below.

Figure 29:
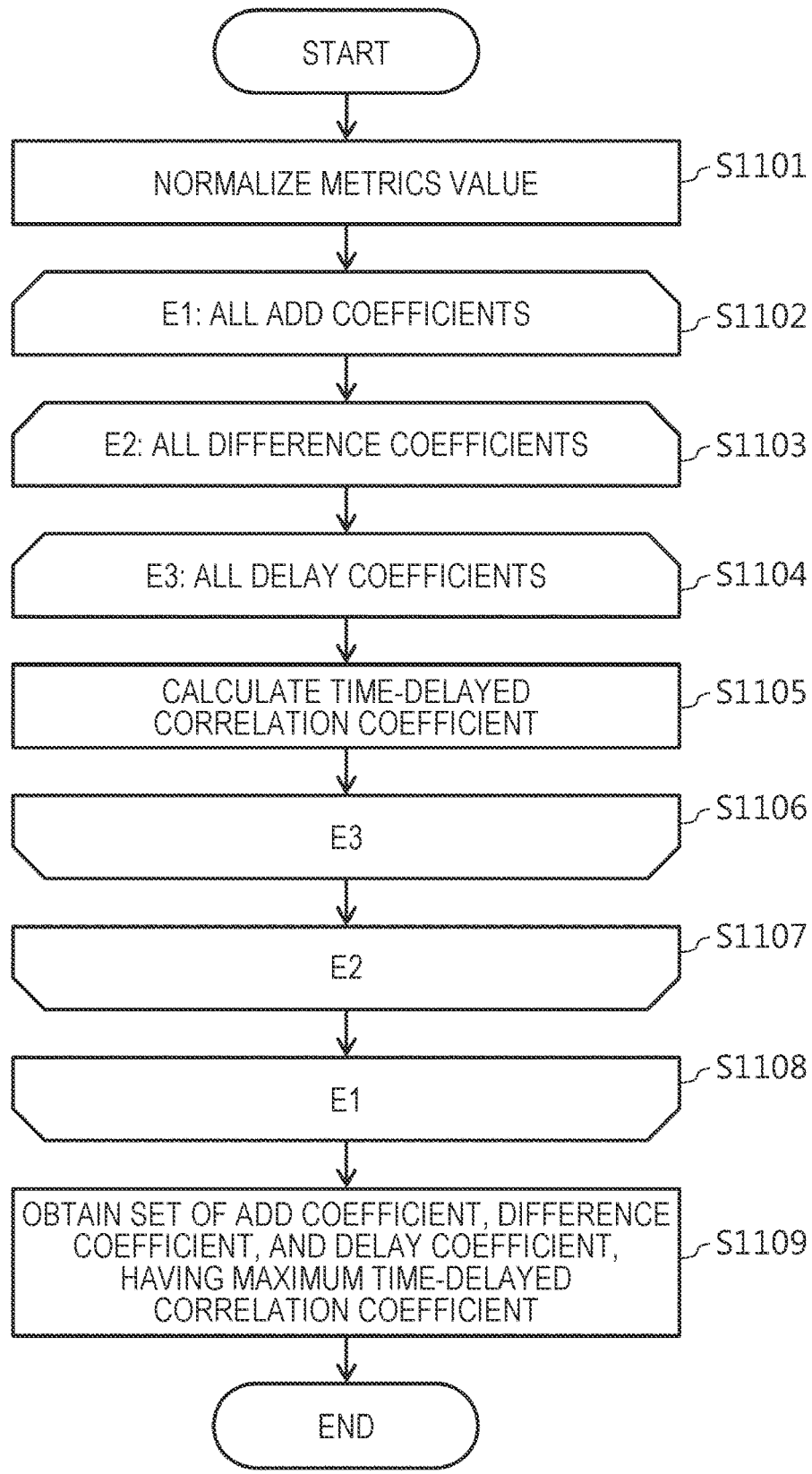
FIG. 29 is a flowchart illustrating time-delayed correlation coefficient calculation processing.

Next, details of the time-delayed correlation coefficient calculation processing will be described with reference to FIG. 29.

Figure 28:
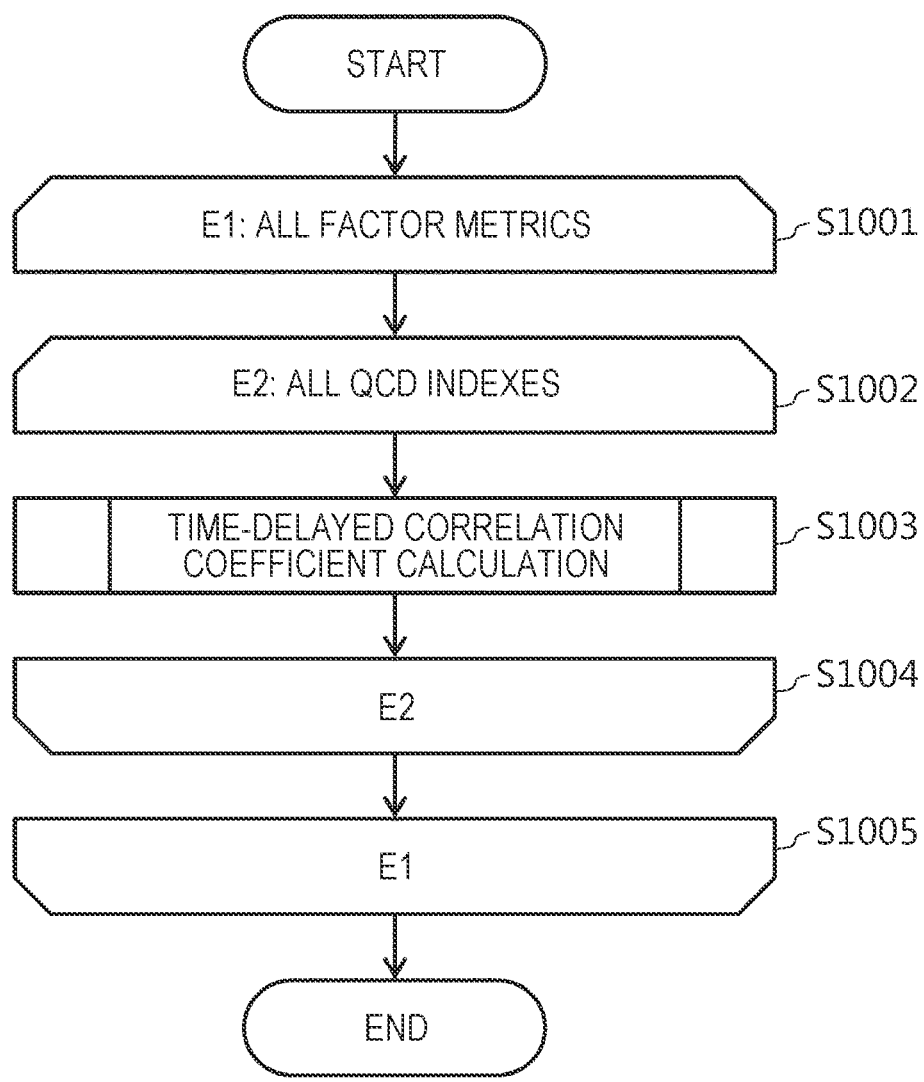
FIG. 28 is a flowchart illustrating time-delayed correlation calculation processing.

This processing corresponds to S1003 in FIG. 28.

First, the delay correlation calculation unit 109 of the source code analysis apparatus 10 normalizes the input target QCD index and factor metrics value (S1101). For example, the value is normalized by dividing each value by (maximum value of value−minimum value of value). In addition, for example, outlier removal using a box plot is performed.

The processing in S1103 to S1107 is performed on all the add coefficients E1 (S1102 to S1108).

In the loop of S1102 to S1108, the processing of S1104 to S1106 is performed on all the delta coefficients E2 (S1103 to S1106).

In the loop of S1103 to S1106, the time-delayed correlation coefficients in the add coefficient E1, the delta coefficient E2, and the delay coefficient E3 are calculated for all the delay coefficients E3 (S1104 to S1106) by the method described above for the input target QCD index and factor metrics value (S1105).

A set having the maximum time-delayed correlation coefficient is obtained from all the sets of the add coefficient, the delta coefficient, and the delay coefficient (S1109), and is stored in the delay correlation list 134.

Figure 30:
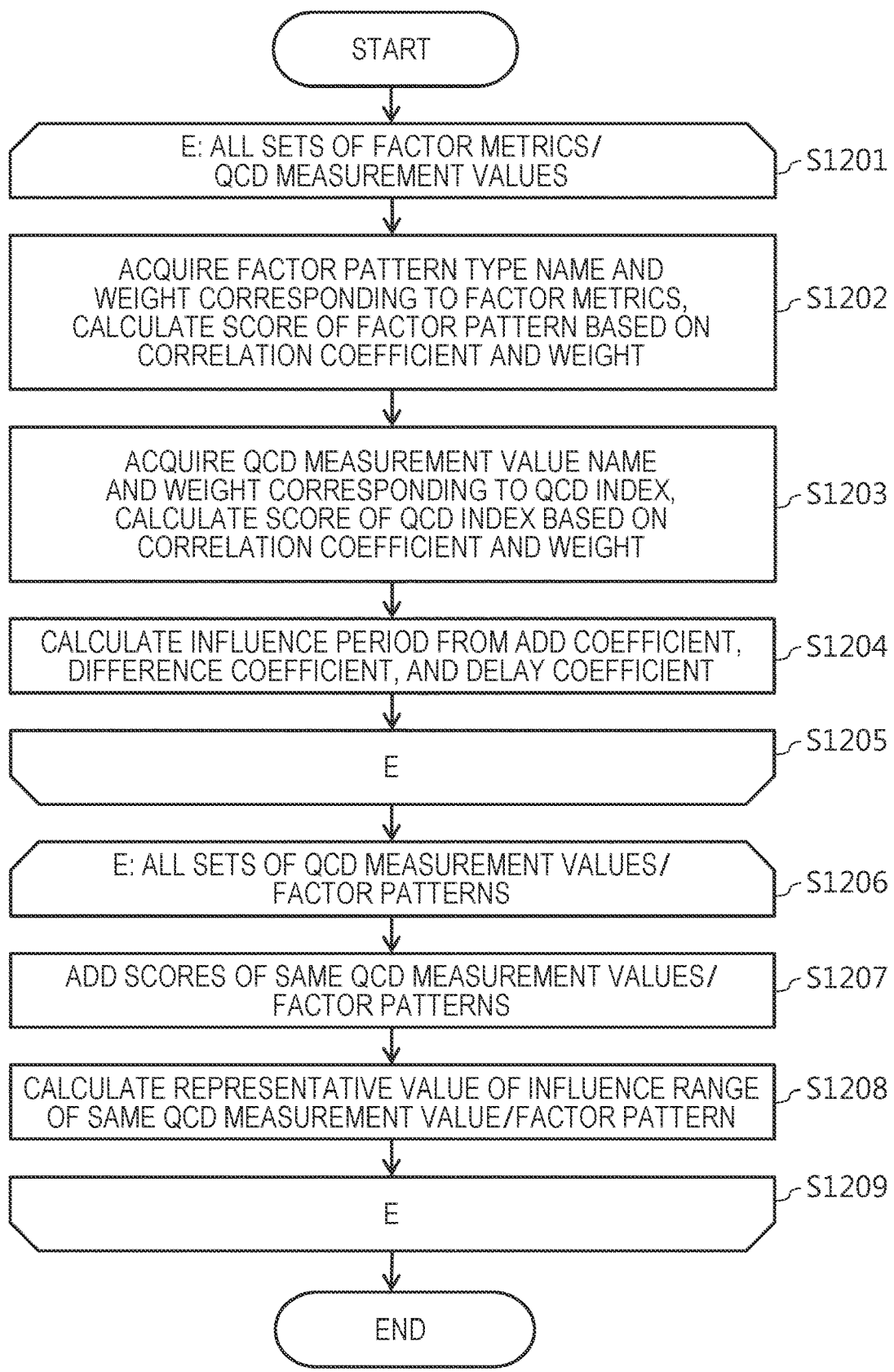
FIG. 30 is a flowchart illustrating important pattern analysis processing by time-delayed correlation analysis.

Next, important pattern analysis processing by time-delayed correlation analysis will be described with reference to FIG. 30.

Figure 26:
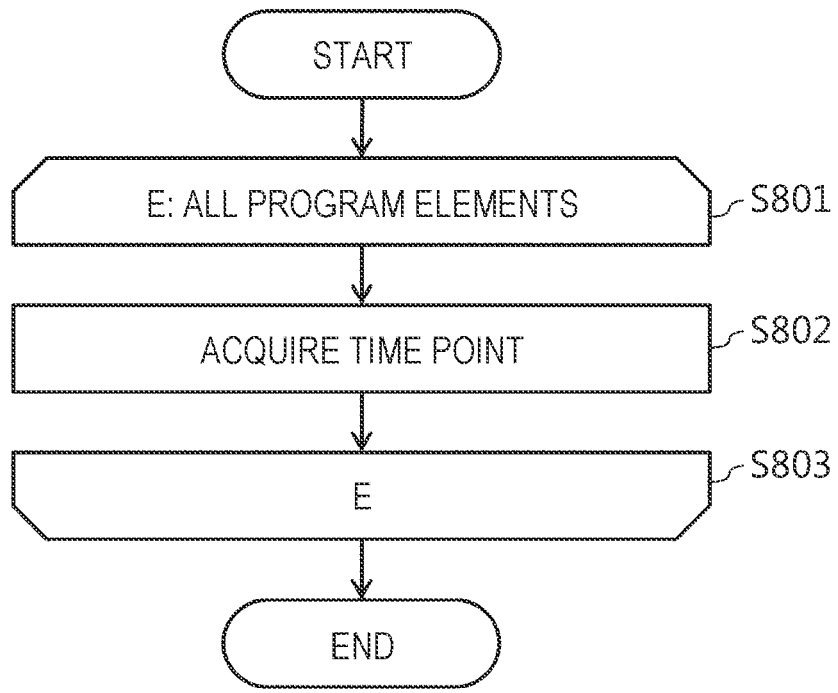
FIG. 26 is a flowchart illustrating factor metrics time-series information addition processing.

The important factor pattern analysis unit 110 by the time-delayed correlation analysis illustrated in FIG. 26 of the source code analysis apparatus 10 performs S1201 to S1204 on all the sets E1 and E2 of the factor metrics and QCD measurement values (S1202 to S1205).

In the loop of S1201 to S1205, the factor pattern type name and weight corresponding to the factor metrics E1 are acquired from the factor pattern/factor metrics definition table 129, and the score of the factor pattern is calculated based on the time-delayed correlation coefficient stored in the delay correlation list 134 and the weight (S1202). For example, the score of the factor pattern is a product of the time-delayed correlation coefficient and the weight.

Next, the QCD measurement value name and the weight corresponding to the QCD index E2 are acquired from the QCD measurement value/QCD index definition table 130, and the score of the QCD index is calculated based on the time-delayed correlation coefficient stored in the delay correlation list 134 and the weight (S1203). For example, the score of the QCD index is a product of the time-delayed correlation coefficient and the weight.

Next, an influence period is calculated from the add coefficient, the delta coefficient, and the delay coefficient of the delay correlation list 134 (S1204). For example, the sum of the add coefficient and the delay coefficient is set as the influence period.

Next, S1206 to S1210 are performed on all the same sets E of factor patterns and QCD measurement values (S1207 to S1209).

In the loop of S1206 to S1210, the sum of the score of the factor pattern and the score of the QCD index is taken as the score for the set E of the factor pattern and the QCD measurement value, the scores for the set E of the same factor pattern and the QCD measurement value are added (S1207), and the added score is stored in the important factor pattern information table 135 by the time-delayed correlation analysis. The adding method is, for example, summing.

The representative value is calculated for the influence period calculated in S1260 having the same set E of QCD measurement value and factor pattern, and set as the influence period of the same QCD measurement value and factor pattern E (S1208), and the influence period is stored in the important factor pattern information table 135 by time-delayed correlation analysis. For example, the median value for the influence period calculated in S1260 is set as the representative value.

As described above, according to the present embodiment, by performing the time-delayed correlation analysis with the factor pattern as the explanatory variable and the QCD measurement value as the objective variable, it is possible to quantitatively grasp the causal relationship of the influence by the anti-pattern and the refactoring pattern in the software development in consideration of the temporal order, and it is possible to expect the improvement in the quality of the software and the improvement in the development efficiency.

What is claimed is:

1. A source code analysis apparatus that presents an influence of a factor pattern on software development by using an anti-pattern or a refactoring pattern in software development as the factor pattern, the source code analysis apparatus comprising:
   a user interface including a display screen that presents information to a user of the source code analysis apparatus;
   a hardware processor:
   a non-transitory computer-readable medium storing a program with instructions, which when executed by the hardware processor cause the hardware processor to:
   acquire information on a factor pattern from a ticket, a source code change history, and a source code related to software to be analyzed;
   calculate factor metrics from the factor pattern;
   acquire a QCD measurement value, which is a measured value related to any of quality, cost, and delivery, from a ticket to be analyzed, a change history, and a source code;
   calculate a QCD index for evaluating quality, cost, and delivery from the QCD measurement value;
   calculate a correlation between the factor metrics and the QCD index and generate a correlation list; and
   store information regarding weighting of the factor pattern and factor metrics related thereto, and information regarding weighting of the QCD measurement value and a QCD index related thereto;
   wherein,
   when any one or a combination of the ticket, the source code change history, and the source code is input, the hardware processor:
   generates information on a factor pattern from the ticket, the source code change history, and the source code which are input, and
   calculates factor metrics related to the factor pattern as measured information related to the factor pattern,
   acquires the QCD measurement value from the ticket, the source code change history, and the source code which are input,
   calculates the QCD index based on the QCD measurement value,
   calculates a correlation coefficient for a pair of the factor metrics and the QCD index, and stores the correlation coefficient in the correlation list,
   calculates a score for a pair of the factor pattern and the QCD measurement value on a basis of the correlation list, information regarding weighting of the factor pattern and factor metrics related thereto, and information regarding weighting of the QCD measurement value and a QCD index related thereto, and generates an important factor pattern information table in which a score is assigned to the pair of the factor pattern and the QCD measurement value;
   wherein the instructions further cause the hardware processor to:
   add, to information of the factor pattern, information of an occurrence time point of the factor pattern for which the factor metrics are measured;
   add information of an occurrence time point of an event related to a QCD measurement value which is a basis of calculation of the QCD index to the information of the QCD index;
   perform time-delayed correlation analysis with factor metrics as an explanatory variable and a QCD index as an objective variable from information of factor metrics to which information of an occurrence time point of a factor pattern for which the factor metrics are measured is added and information of a QCD index to which information of an occurrence time point of an event related to a QCD measurement value which is a basis of calculation of the QCD index is added, and generate a delay correlation list holding a coefficient of the time-delayed correlation analysis; and
   calculate a time-delayed correlation coefficient for a pair of the factor metrics and the QCD index, and stores the time-delayed correlation coefficient in the delay correlation list;
   wherein the user interface is configured to present information of the important factor pattern information table to the user via the display screen.

2. The source code analysis apparatus according to claim 1, wherein
   the hardware processor calculates a rank of the pair of the factor pattern and the QCD measurement value, and stores the rank of the pair of the factor pattern and the QCD measurement value in the important factor pattern information table.

3. The source code analysis apparatus according to claim 1, wherein the hardware processor stores, in the important factor pattern information table, information indicating any one of quality, cost, and delivery on which the QCD measurement value is based for the pair of the factor pattern and the QCD measurement value.

4. The source code analysis apparatus according to claim 1, wherein the hardware processor calculates an influence period relating to factor metrics and a QCD index, and stores the influence period in the delay correlation list.

5. A source code analysis method by a source code analysis apparatus that presents an influence of a factor pattern on software development by using an anti-pattern or a refactoring pattern in software development as the factor pattern, wherein
   the source code analysis apparatus includes:
   a user interface including a display screen that presents information to a user of the source code analysis apparatus;
   a hardware processor; and
   a non-transitory computer-readable medium storing a program with instructions, which when executed by the hardware processor cause the hardware processor to:
   acquire information on a factor pattern from a ticket, a source code change history, and a source code related to software to be analyzed;
   calculate factor metrics from the factor pattern;
   acquire a QCD measurement value, which is a measured value related to any of quality, cost, and delivery, from a ticket to be analyzed, a change history, and a source code;

calculate a QCD index for evaluating quality, cost, and delivery from the QCD measurement value;

calculate a correlation between the factor metrics and the QCD index and generate a correlation list;

wherein the hardware processor holds information regarding weighting of the factor pattern and factor metrics related thereto, and information regarding weighting of the QCD measurement value and a QCD index related thereto, and the source code analysis method comprises:

receiving, by the source code analysis apparatus, an input of any one of the ticket, the source code change history, and the source code, or an input of a combination of the ticket, the source code change history, and the source code;

generating, by the hardware processor, information of a factor pattern from the ticket, the source code change history, and the source code which are input;

calculating, by the hardware processor, factor metrics regarding the factor pattern as measured information regarding the factor pattern;

acquiring, by the hardware processor, the QCD measurement value from the ticket, the source code change history, and the source code which are input;

calculating, by the hardware processor, the QCD index based on the QCD measurement value;

calculating, by the hardware processor, a correlation coefficient for a pair of the factor metrics and the QCD index, and storing the correlation coefficient in the correlation list;

calculating, by the hardware processor, a score for a pair of the factor pattern and the QCD measurement value on a basis of the correlation list, information regarding weighting of the factor pattern and factor metrics related thereto, and information regarding weighting of the QCD measurement value and a QCD index related thereto, and generating an important factor pattern information table in which a score is assigned to a pair of the factor pattern and the QCD measurement value;

adding, to information of the factor pattern, information of an occurrence time point of the factor pattern for which the factor metrics are measured;

adding information of an occurrence time point of an event related to a QCD measurement value which is a basis of calculation of the QCD index to the information of the QCD index;

performing time-delayed correlation analysis with factor metrics as an explanatory variable and a QCD index as an objective variable from information of factor metrics to which information of an occurrence time point of a factor pattern for which the factor metrics are measured is added and information of a QCD index to which information of an occurrence time point of an event related to a QCD measurement value which is a basis of calculation of the QCD index is added, and generate a delay correlation list holding a coefficient of the time-delayed correlation analysis; and calculating a time-delayed correlation coefficient for a pair of the factor metrics and the QCD index, and stores the time-delayed correlation coefficient in the delay correlation list; and presenting, by the user interface, information of the important factor pattern information table to the user via the display screen.

6. The source code analysis method according to claim 5, wherein the instructions cause the hardware processor to:

add, to information of the factor pattern, information of an occurrence time point of the factor pattern for which the factor metrics are measured; and add information of an occurrence time point of an event related to a QCD measurement value which is a basis of calculation of the QCD index to the information of the QCD index; and perform time-delayed correlation analysis with factor metrics as an explanatory variable and a QCD index as an objective variable from information of factor metrics to which information of an occurrence time point of a factor pattern for which the factor metrics are measured is added and information of a QCD index to which information of an occurrence time point of an event related to a QCD measurement value which is a basis of calculation of the QCD index is added, and generate a delay correlation list holding a coefficient of the time-delayed correlation analysis, and the source code analysis method further comprises:

calculating, by the hardware processor, a time-delayed correlation coefficient for a pair of the factor metrics and the QCD index, and storing the time-delayed correlation coefficient in the delay correlation list.

* * * * *